US012739732B2

(12) United States Patent
Hyde et al.

(10) Patent No.: US 12,739,732 B2
(45) Date of Patent: Sep. 15, 2026

(54) APPARATUS, SYSTEM, METHOD AND COMPUTER-IMPLEMENTED STORAGE MEDIA TO IMPLEMENT A PER DATA PACKET QUALITY OF SERVICE REQUIREMENT IN A COMMUNICATION NETWORK

(71) Applicant: Intel Corporation, Santa Clara, CA (US)

(72) Inventors: Maruti Gupta Hyde, Portland, OR (US); Yi Zhang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/944,824

(22) Filed: Sep. 14, 2022

(65) Prior Publication Data

US 2023/0015829 A1 Jan. 19, 2023

(51) Int. Cl.

*H04W 40/28* (2009.01)
*H04W 40/12* (2009.01)
*H04W 40/24* (2009.01)

(52) U.S. Cl.

CPC ......... *H04W 40/28* (2013.01); *H04W 40/125* (2013.01); *H04W 40/248* (2013.01)

(58) Field of Classification Search

CPC ............. H04W 28/0268; H04W 28/24; H04W 28/0967; H04W 40/28; H04W 40/125; H04W 40/248; H04L 65/80

See application file for complete search history.

(56) References Cited

U.S. PATENT DOCUMENTS

2020/0178109 A1* 6/2020 Fang ................. H04W 28/0263
2021/0004222 A1* 1/2021 Huang .................... H04L 65/80
2022/0062942 A1* 3/2022 Greenenko ......... B05B 17/0653
2023/0137968 A1* 5/2023 Stockhammer ... H04W 28/0268
370/235

FOREIGN PATENT DOCUMENTS

WO WO-2018228032 A1 * 12/2018 ............ H04M 15/66
WO WO-2022056851 A1 * 3/2022 ............ H04W 28/24

* cited by examiner

*Primary Examiner* — Shukri Taha
(74) *Attorney, Agent, or Firm* — Alliance IP, LLC

(57) ABSTRACT

An apparatus of a computing node of a communication network, a system, a machine-readable storage medium, and a method. One or more processing circuitries of the apparatus are to: receive a plurality of service data flows (SDFs) associated with respective applications to be executed, the SDFs including data packets; determine first Quality of Service (QoS) flows corresponding to a plurality of first QoS requirements for the SDFs, wherein SDFs associated with a same application correspond to a same QoS requirement of the plurality of first QoS requirements; change the first QoS flows to second QoS flows different from the first QoS flows, the second QoS flows corresponding to a plurality of second QoS requirements for respective ones of the SDFs, the second QoS flows based on the respective applications and further based on respective ones of the data packets; and send for transmission from the output the plurality of SDFs based on the second QoS flows.

25 Claims, 17 Drawing Sheets

1200

APPARATUS, SYSTEM, METHOD AND COMPUTER-IMPLEMENTED STORAGE MEDIA TO IMPLEMENT A PER DATA PACKET QUALITY OF SERVICE REQUIREMENT IN A COMMUNICATION NETWORK

FIELD

Embodiments relate to the determination of Quality of Service (QoS) requirements in a communication network.

BACKGROUND

In a Third Generation Partnership Project (3GPP) network, in order to change the flow-based end-to-end QoS of a transmission, or to establish a new QoS flow with a changed QoS setting, a protocol data unit (PDU) Session Modification procedure is triggered by either UE or the network (e.g. a RAN node). The network will then decide whether to grant the request and, if yes, then modify the parameters of the bearer to which the flow belongs or establish a new QoS flow by modifying the 5G QoS identifier (5QI). This solution allows the possibility of changing the QoS associated with a flow during a session.

There have been some discussions in 3GPP's SA2 eV2X study to enable RAN node to get from a CN multiple QoS levels which can then be mapped to a session. This would allow a RAN node to modify the QoS level of the session faster and to monitor, if possible, any QoS downgrades. This solution would be beneficial for safety-critical and low latency V2X services, since the CN would not need to perform actions to dynamically change the QoS level, meaning that no PDA Session Modification procedure would be needed.

Some solutions have proposed using a Differentiated Services (DiffServ) field in an IP packet header in order to indicate a QoS for the associated packet.

Some solutions have suggested using Deep-Packet Inspection (DPI). According to this solution, at the network layer or below, an intermediate network entity inspects the packet header for a given application, and tries to decode the information within the packet header. For example, the real time transport (RTP) protocol header for video applications to determine the significance of that packet and then assign the appropriate priority and other QoS metrics to that packet.

DETAILED DESCRIPTION

Embodiments will focus on a software framework to allow an edge computing node to determine a QoS of a transmission based on an application associated with the transmission.

Sections A through H. below will provide an overview of configurations for edge computing, such as wireless edge computing, including, respectively, overviews of edge computing, usage of containers in edge computing, mobility and multi-access edge computing (MEC) in edge computing settings, computing architectures and systems, machine readable medium and distributed software instructions, a satellite edge connectivity use case, software distribution in edge computing settings. Section H. provides an overview of machine learning in edge computing networks. Section I. provides an overview of a cellular network, such as a 5G network.

Section J. provides a detailed description of some respective demonstrative embodiments that address challenges of determining QoS requirements within a cellular network, such as a 5G network. Aspects of embodiments described in Section J may be combined with/implemented with other aspects described in any one of the other Sections herein as would be recognized by one skilled in the art. Embodiments of Section J may be deployed or implemented using any of the configurations or environments described in any of Sections A. through I. described below.

A. Overviews of Edge Computing

Figure 1:
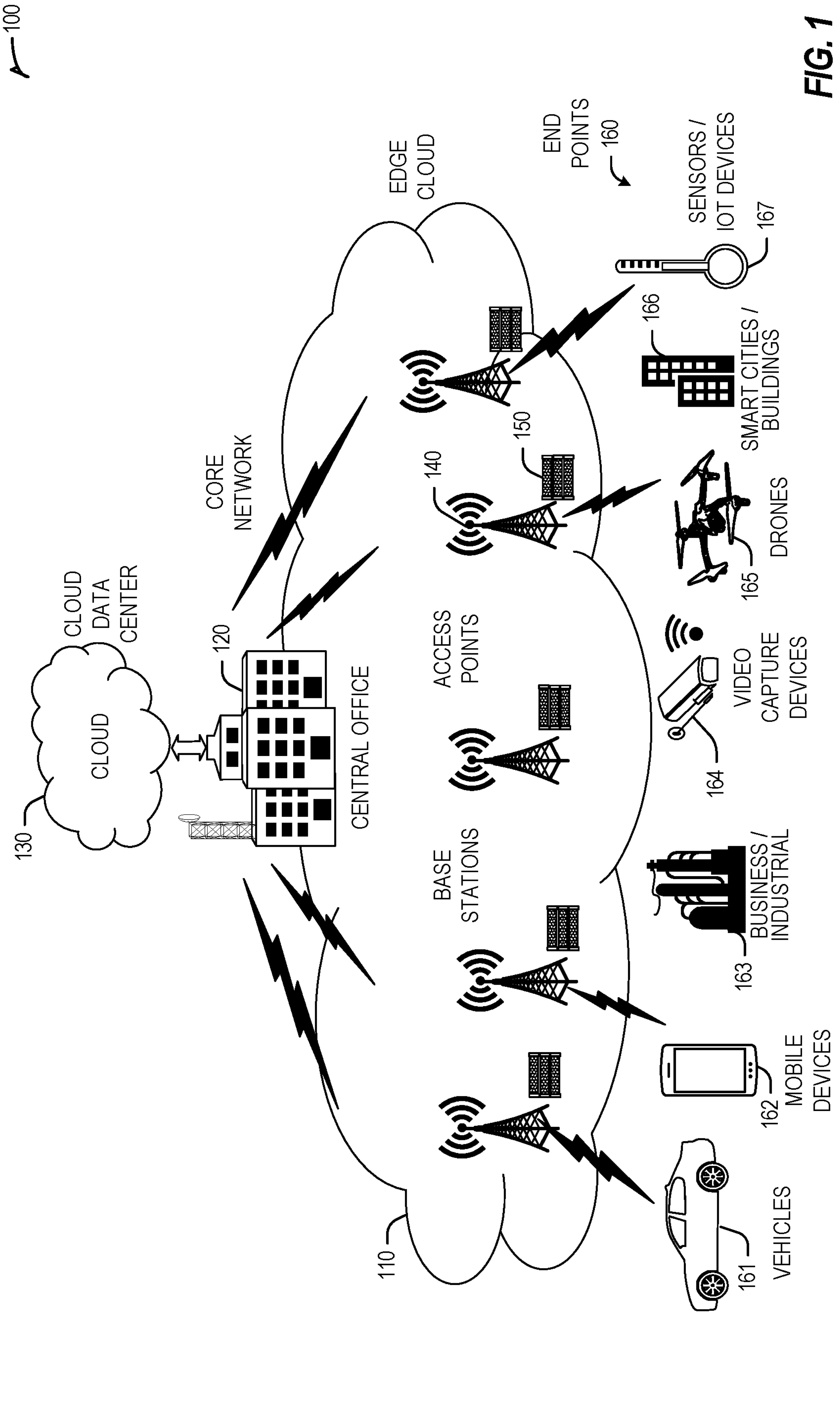
FIG. 1 illustrates an overview of an edge cloud configuration for edge computing.

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power might be constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, which may use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
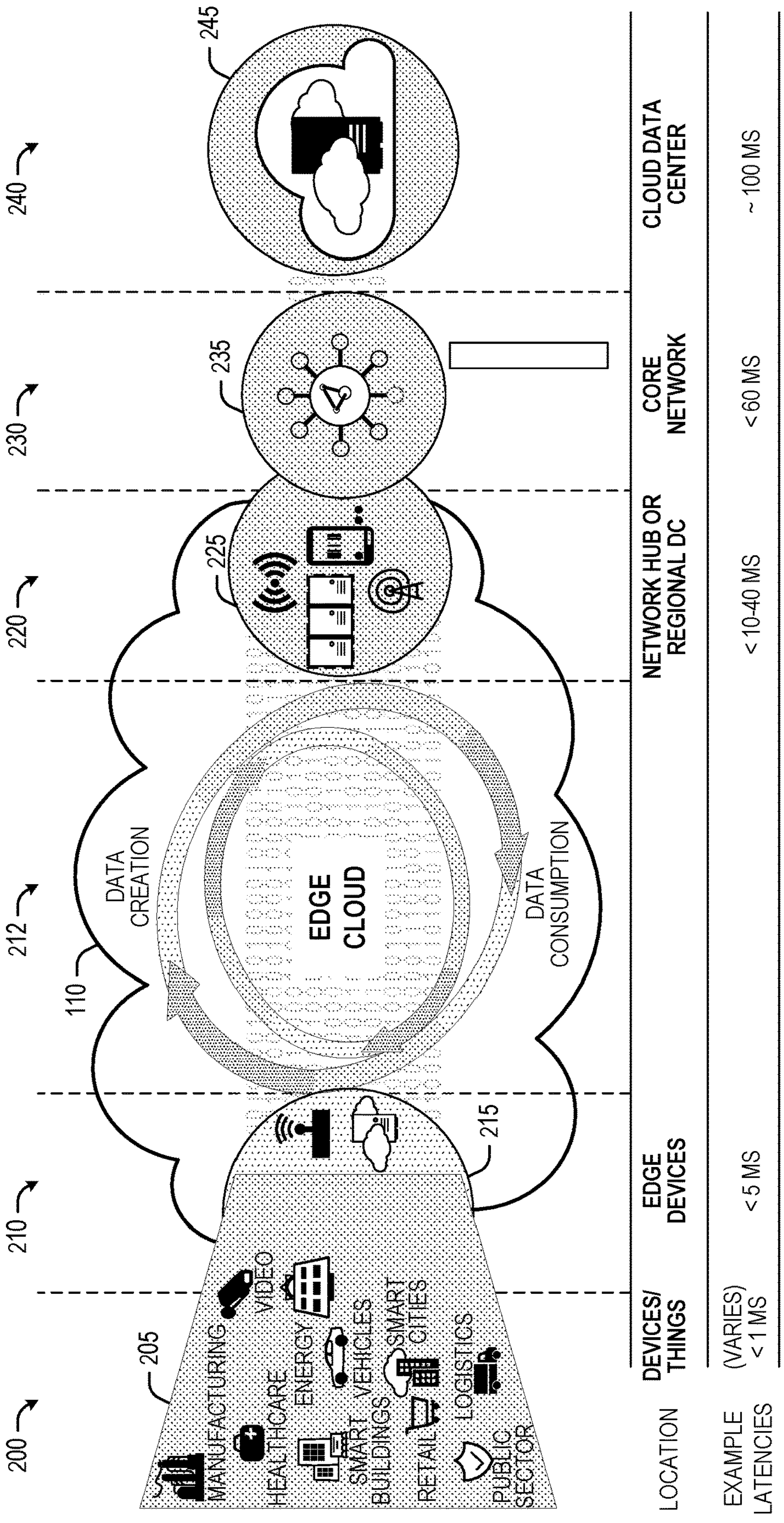
FIG. 2 illustrates operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the edge devices layer 210, to even between 10 to 40 ms when communicating with nodes at the network access layer 220. Beyond the edge cloud 110 are core network 230 and cloud data center 240 layers, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 235 or a cloud data center 245, a central office or content data network may be considered as being located within a "near edge" layer ("near" to the cloud, having high latency values when communicating with the devices and endpoints of the use cases 205), whereas an access point, base station, on-premise server, or network gateway may be considered as located within a "far edge" layer ("far" from the cloud, having low latency values when communicating with the devices and endpoints of the use cases 205). It will be understood that other categorizations of a particular network layer as constituting a "close", "local", "near", "middle", or "far" edge may be based on latency, distance, number of network hops, or other measurable characteristics, as measured from a source in any of the network layers 200-240.

The various use cases 205 may access resources under usage pressure from incoming streams, due to multiple services utilizing the edge cloud. To achieve results with low latency, the services executed within the edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge may be resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 110 (network layers 200-240), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the Examples provided herein, a client computing node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge computing nodes among network layers 210-230. The edge cloud 110 thus may be embodied as any type of network that provides edge computing and/or storage resources which are proximately located to radio access network (RAN) capable endpoint devices (e.g., mobile computing devices, IoT devices, smart devices, etc., which may be compatible with Open RAN (O-RAN) specifications promulgated by the O-RAN Alliance), which are discussed herein. In other words, the edge cloud 110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 110 may be servers, multi-tenant servers, appliance computing devices, and/or any other type of computing devices. For example, the edge cloud 110 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, sleds, etc.). A server rack may refer to a structure that is designed specifically to house technical equipment including routers, switches, hubs, servers (including CPU and/or GPU-based compute devices), data storage devices (e.g., storage area network (SAN) devices), or other types of computing or networking devices. The rack may make it possible to securely hold multiple pieces of equipment in one area. In some cases, the rack may include one or more sleds. A sled may refer to a housing that allows for a number of various compute, GPU, and/or storage devices to be housed in a position of a rack (e.g., a 4 unit (4U)-sized or other-sized unit). The sled may allow for the devices housed within it to be hot-swappable in some instances. Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 8. The edge cloud 110 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 3:
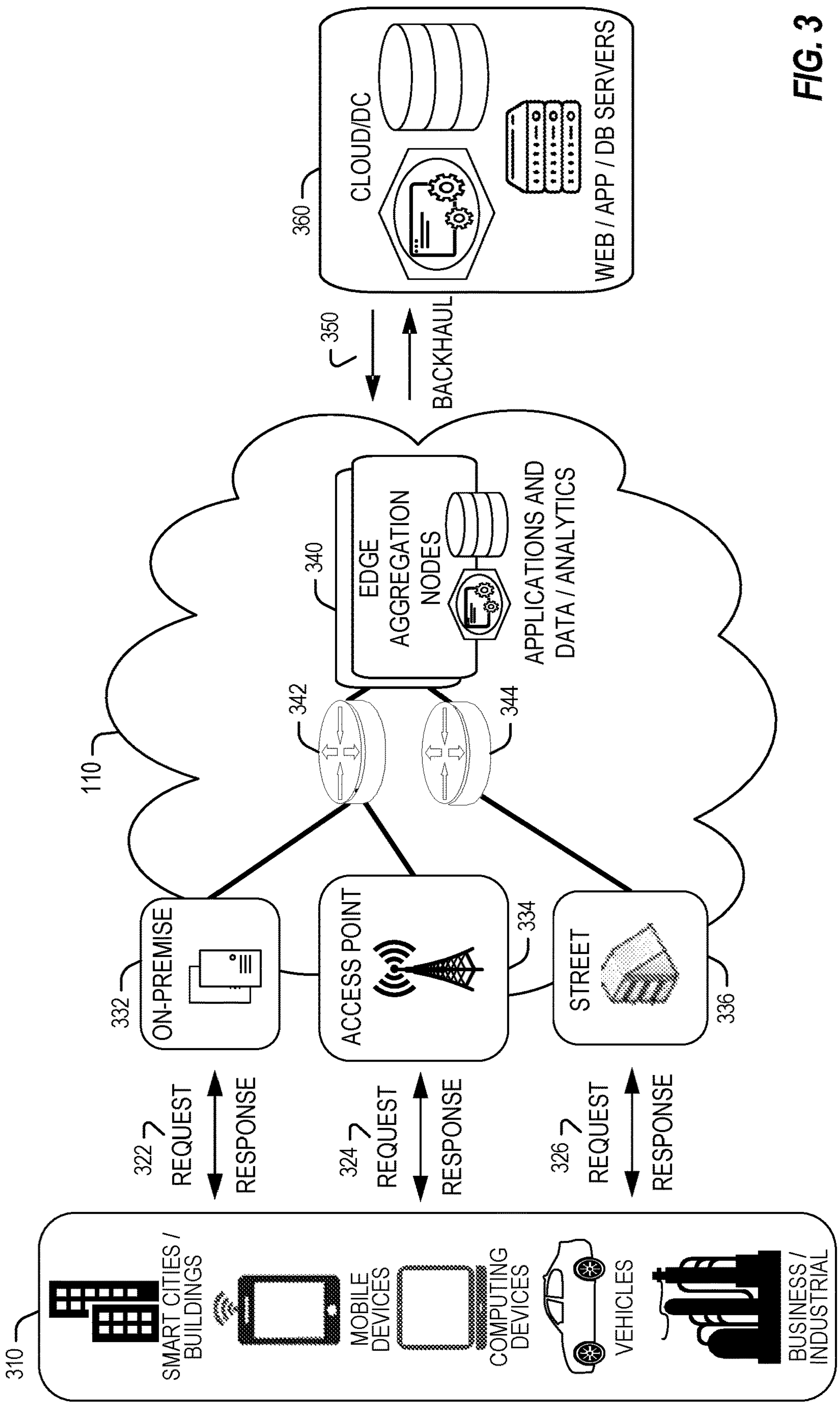
FIG. 3 illustrates an example approach for networking and services in an edge computing system.

In FIG. 3, various client endpoints 310 (in the form of mobile devices, computers, autonomous vehicles, business computing equipment, industrial processing equipment) exchange requests and responses that are specific to the type of endpoint network aggregation. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the edge cloud 110 to aggregate traffic and requests. Thus, within the edge cloud 110, the TSP may deploy various compute and storage resources, such as at edge aggregation nodes 340, to provide requested content. The edge aggregation nodes 340 and other systems of the edge cloud 110 are connected to a cloud or data center 360, which uses a backhaul network 350 to fulfill higher-latency requests from a cloud/data center for websites, applications, database servers, etc. Additional or consolidated instances of the edge aggregation nodes 340 and the aggregation points 342, 344, including those deployed on a single server framework, may also be present within the edge cloud 110 or other areas of the TSP infrastructure.

B. Usage of Containers in Edge Computing

Figure 4:
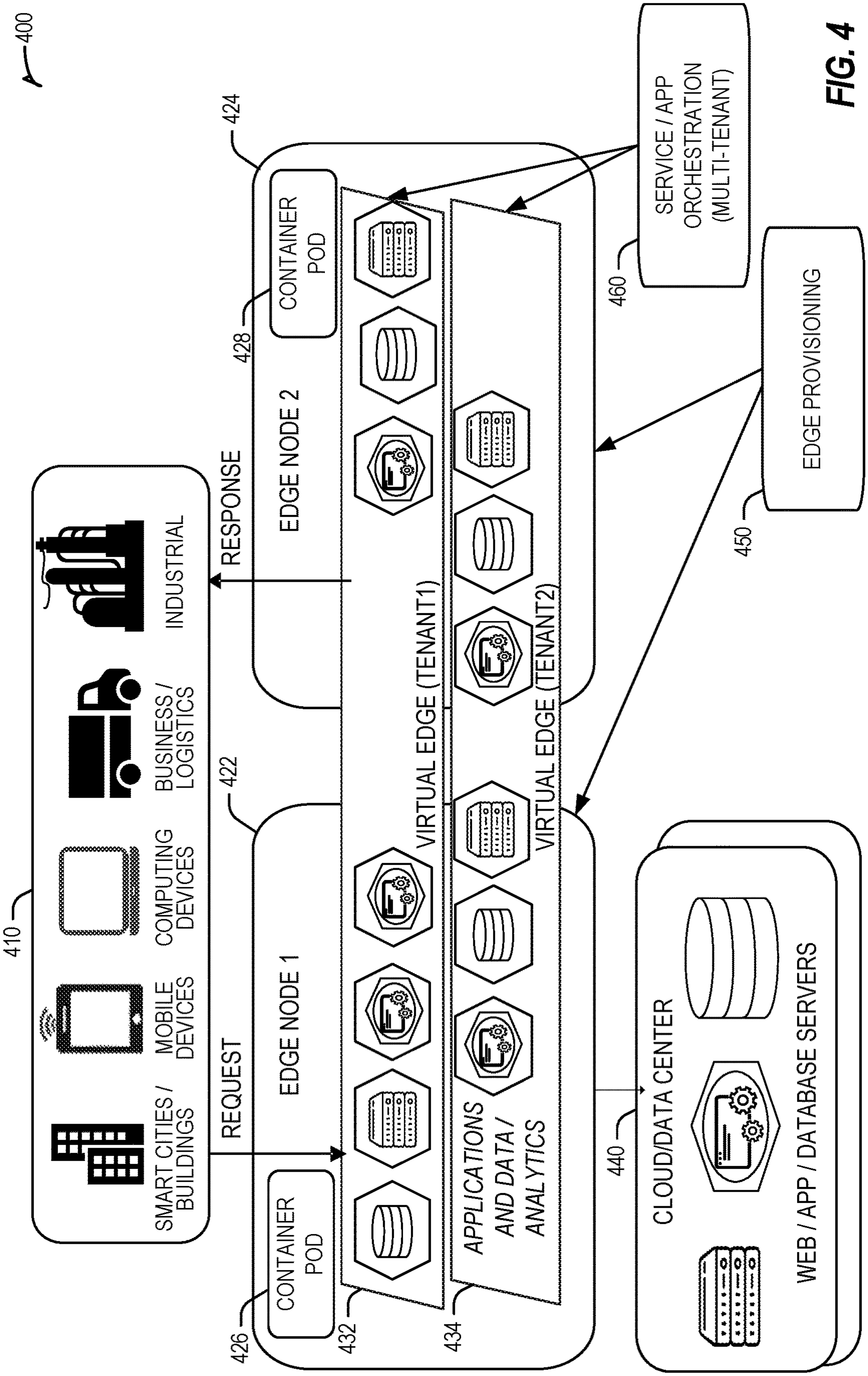
FIG. 4 illustrates deployment of a virtual edge configuration in an edge computing system operated among multiple edge nodes and multiple tenants.

FIG. 4 illustrates deployment and orchestration for virtualized and container-based edge configurations across an edge computing system operated among multiple edge nodes and multiple tenants (e.g., users, providers) which use such edge nodes. Specifically, FIG. 4 depicts coordination of a first edge node 422 and a second edge node 424 in an edge computing system 400, to fulfill requests and responses for various client endpoints 410 (e.g., smart cities/building systems, mobile devices, computing devices, business/logistics systems, industrial systems, etc.), which access various virtual edge instances. Here, the virtual edge instances 432, 434 provide edge compute capabilities and processing in an edge cloud, with access to a cloud/data center 440 for higher-latency requests for websites, applications, database servers, etc. However, the edge cloud enables coordination of processing among multiple edge nodes for multiple tenants or entities.

In the example of FIG. 4, these virtual edge instances include: a first virtual edge 432, offered to a first tenant (Tenant 1), which offers a first combination of edge storage, computing, and services; and a second virtual edge 434, offering a second combination of edge storage, computing, and services. The virtual edge instances 432, 434 are distributed among the edge nodes 422, 424, and may include scenarios in which a request and response are fulfilled from the same or different edge nodes. The configuration of the edge nodes 422, 424 to operate in a distributed yet coordinated fashion occurs based on edge provisioning functions 450. The functionality of the edge nodes 422, 424 to provide coordinated operation for applications and services, among multiple tenants, occurs based on orchestration functions 460.

It should be understood that some of the devices in 410 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 422, 424 may operate as security feature enforcement points for local resources allocated to multiple tenants per node. Additionally, tenant runtime and application execution (e.g., in instances 432, 434) may serve as an enforcement point for a security feature that creates a virtual edge abstraction of resources spanning potentially multiple physical hosting platforms. Finally, the orchestration functions 460 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes may use containers, FaaS engines, Servlets, servers, or other computation abstraction that may be partitioned according to a DICE layering and fan-out structure to support a RoT context for each. Accordingly, the respective RoTs spanning devices 410, 422, and 440 may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 4. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each edge node 422, 424 may implement the use of containers, such as with the use of a container "pod" 426, 428 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 432, 434 are partitioned according to the needs of each container.

With the use of container pods, a pod controller oversees the partitioning and allocation of containers and resources. The pod controller receives instructions from an orchestrator (e.g., orchestrator 460) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid potential resource starvation situations. Further controls may be provided to ensure attestation and trustworthiness of the pod and pod controller. For instance, the orchestrator 460 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked prior to the second pod executing.

Figure 5:
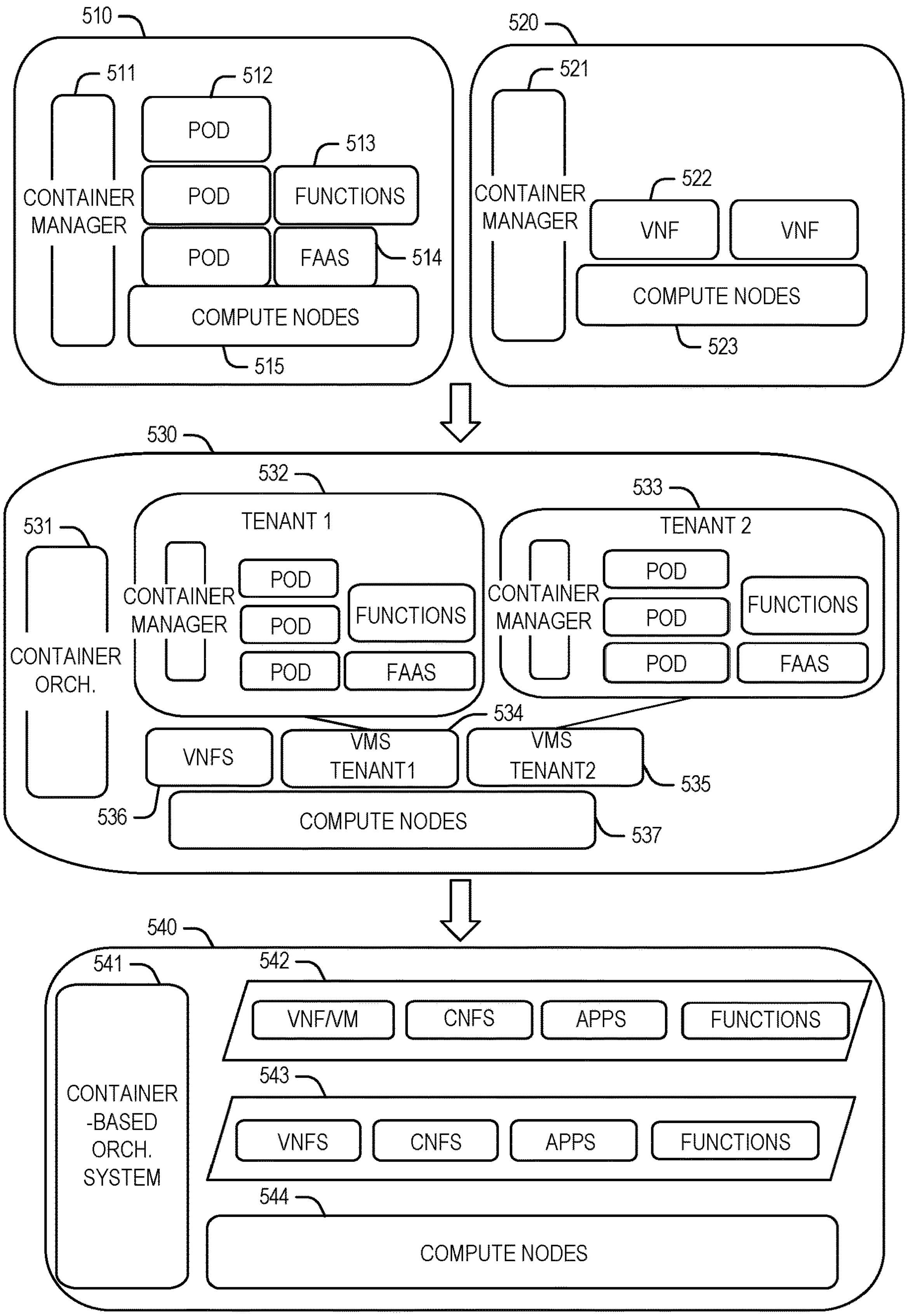
FIG. 5 illustrates various compute arrangements deploying containers in an edge computing system.

FIG. 5 illustrates additional compute arrangements deploying containers in an edge computing system. As a simplified example, system arrangements 510, 520 depict settings in which a pod controller (e.g., container managers 511, 521, and container orchestrator 531) is adapted to launch containerized pods, functions, and functions-as-a-service instances through execution via computing nodes (515 in arrangement 510), or to separately execute containerized virtualized network functions through execution via computing nodes (523 in arrangement 520). This arrangement is adapted for use of multiple tenants in system arrangement 530 (using computing nodes 537), where containerized pods (e.g., pods 512), functions (e.g., functions 513, VNFs 522, 536), and functions-as-a-service instances (e.g., FaaS instance 514) are launched within virtual machines (e.g., VMs 534, 535 for tenants 532, 533) specific to respective tenants (aside the execution of virtualized network functions). This arrangement is further adapted for use in system arrangement 540, which provides containers 542, 543, or execution of the various functions, applications, and functions on computing nodes 544, as coordinated by an container-based orchestration system 541.

The system arrangements of depicted in FIG. 5 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 5, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/ contract basis. In these contexts, virtualization, containerization, enclaves and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon (SDSi) may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

C. Mobility and Multi-Access Edge Computing (MEC) in Edge Computing Settings

Figure 6:
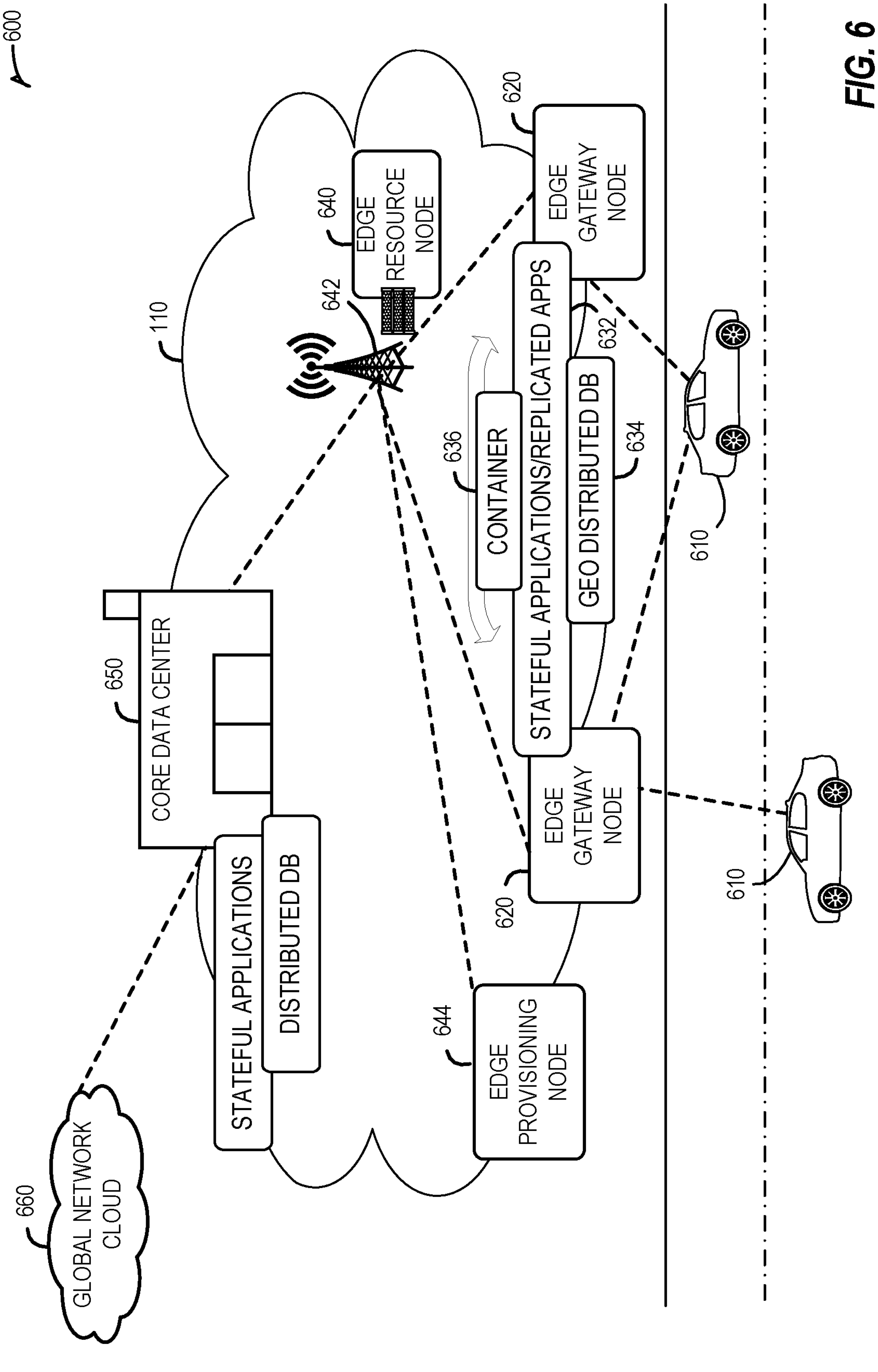
FIG. 6 illustrates a compute and communication use case involving mobile access to applications in an edge computing system.

It should be appreciated that the edge computing systems and arrangements discussed herein may be applicable in various solutions, services, and/or use cases involving mobility. As an example, FIG. 6 shows a simplified vehicle compute and communication use case involving mobile access to applications in an edge computing system 600 that implements an edge cloud 110. In this use case, respective client computing nodes 610 may be embodied as in-vehicle compute systems (e.g., in-vehicle navigation and/or infotainment systems) located in corresponding vehicles which communicate with the edge gateway nodes 620 during traversal of a roadway. For instance, the edge gateway nodes 620 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client computing node 610 and a particular edge gateway device 620 may propagate so as to maintain a consistent connection and context for the client computing node 610. Likewise, mobile edge nodes may aggregate at the high priority services or according to the throughput or latency resolution requirements for the underlying service(s) (e.g., in the case of drones). The respective edge gateway devices 620 include an amount of processing and storage capabilities and, as such, some processing and/or storage of data for the client computing nodes 610 may be performed on one or more of the edge gateway devices 620.

The edge gateway devices 620 may communicate with one or more edge resource nodes 640, which are illustratively embodied as compute servers, appliances or components located at or in a communication base station 642 (e.g., a base station of a cellular network). As discussed above, the respective edge resource nodes 640 include an amount of processing and storage capabilities and, as such, some processing and/or storage of data for the client computing nodes 610 may be performed on the edge resource node 640. For example, the processing of data that is less urgent or important may be performed by the edge resource node 640, while the processing of data that is of a higher urgency or importance may be performed by the edge gateway devices 620 (depending on, for example, the capabilities of each component, or information in the request indicating urgency or importance). Based on data access, data location or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 640 also communicate with the core data center 650, which may include compute servers, appliances, and/or other components located in a central location (e.g., a central office of a cellular communication network). The core data center 650 may provide a gateway to the global network cloud 660 (e.g., the Internet) for the edge cloud 110 operations formed by the edge resource node(s) 640 and the edge gateway devices 620. Additionally, in some examples, the core data center 650 may include an amount of processing and storage capabilities and, as such, some processing and/or storage of data for the client compute devices may be performed on the core data center 650 (e.g., processing of low urgency or importance, or high complexity).

The edge gateway nodes 620 or the edge resource nodes 640 may offer the use of stateful applications 632 and a geographic distributed database 634. Although the applications 632 and database 634 are illustrated as being horizontally distributed at a layer of the edge cloud 110, it will be understood that resources, services, or other components of the application may be vertically distributed throughout the edge cloud (including, part of the application executed at the client computing node 610, other parts at the edge gateway nodes 620 or the edge resource nodes 640, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 636 (or pod of containers) may be flexibly migrated from an edge node 620 to other edge nodes (e.g., 620, 640, etc.) such that the container with an application and workload does not need to be reconstituted, re-compiled, re-interpreted in order for migration to work. However, in such settings, there may be some remedial or "swizzling" translation operations applied. For example, the physical hardware at node 640 may differ from edge gateway node 620 and therefore, the hardware abstraction layer (HAL) that makes up the bottom edge of the container will be re-mapped to the physical layer of the target edge node. This may involve some form of late-binding technique, such as binary translation of the HAL from the container native format to the physical hardware format, or may involve mapping interfaces and operations. A pod controller may be used to drive the interface mapping as part of the container lifecycle, which includes migration to/from different hardware environments.

The scenarios encompassed by FIG. 6 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 620, some others at the edge resource node 640, and others in the core data center 650 or global network cloud 660.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application which may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 600 can include or be in communication with an edge provisioning node 644. The edge provisioning node 644 can distribute software such as the example computer readable instructions 882 of FIG. 8, to various receiving parties for implementing any of the methods described herein. The example edge provisioning node 644 may be implemented by any computer server, home server, content delivery network, virtual server, software distribution system, central facility, storage device, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 644 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 644. For example, the entity that owns and/or operates the edge provisioning node 644 may be a developer, a seller, and/or a licensor (or a customer and/or consumer thereof) of software instructions such as the example computer readable instructions 882 of FIG. 8. The receiving parties may be consumers, service providers, users, retailers, OEMs, etc., who purchase and/or license the software instructions for use and/or re-sale and/or sub-licensing.

In an example, edge provisioning node 644 includes one or more servers and one or more storage devices. The storage devices host computer readable instructions such as the example computer readable instructions 882 of FIG. 8, as described below. Similarly to edge gateway devices 620 described above, the one or more servers of the edge provisioning node 644 are in communication with a base station 642 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third-party payment entity. The servers enable purchasers and/or licensors to download the computer readable instructions 882 from the edge provisioning node 644. For example, the software instructions, which may correspond to the example computer readable instructions 882 of FIG. 8, may be downloaded to the example processor platform/s, which is to execute the computer readable instructions 882 to implement the methods described herein.

In some examples, the processor platform(s) that execute the computer readable instructions 882 can be physically located in different geographic locations, legal jurisdictions, etc. In some examples, one or more servers of the edge provisioning node 644 periodically offer, transmit, and/or force updates to the software instructions (e.g., the example computer readable instructions 882 of FIG. 8) to ensure improvements, patches, updates, etc. are distributed and applied to the software instructions implemented at the end user devices. In some examples, different components of the computer readable instructions 882 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

Figure 7:
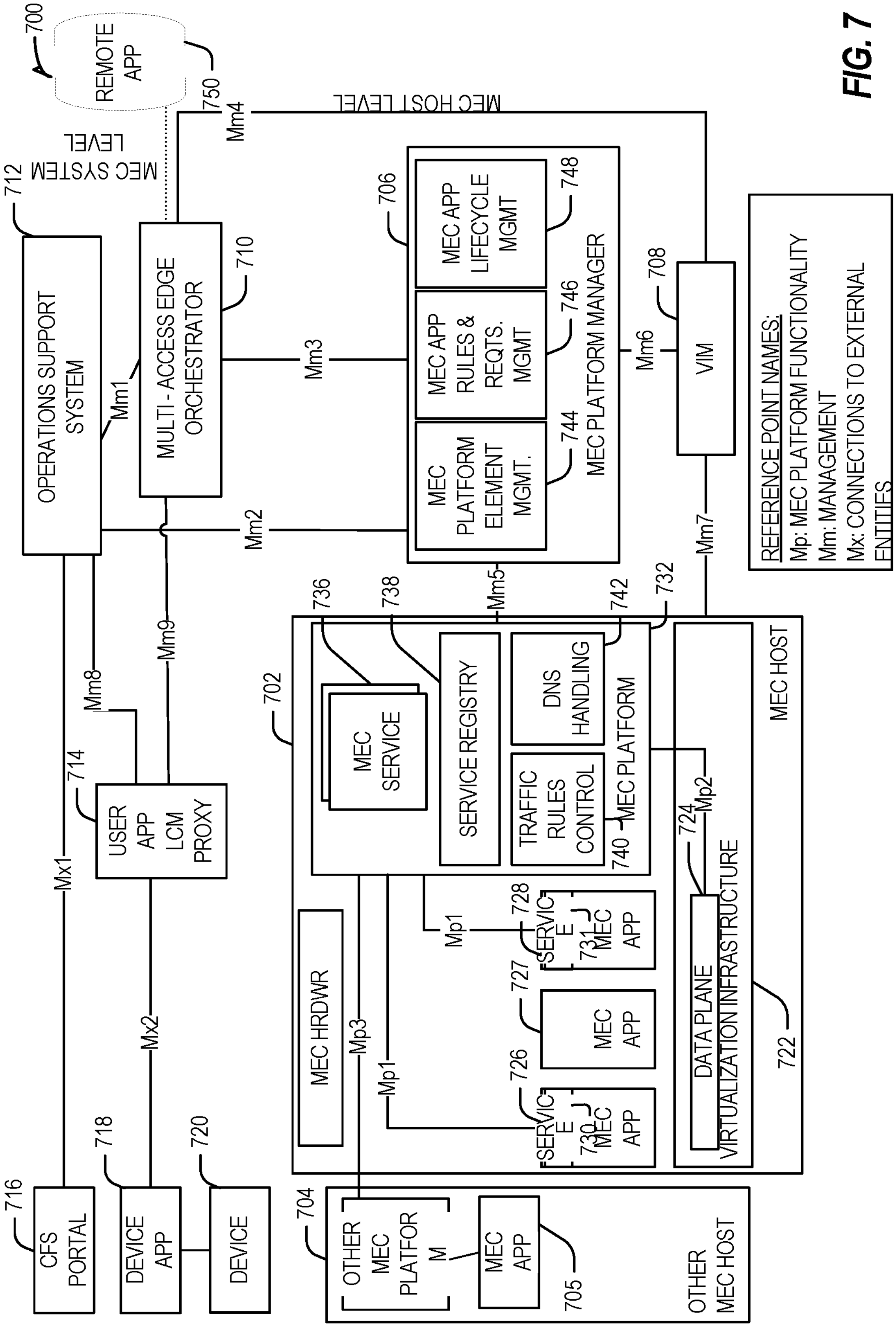
FIG. 7 illustrates an example mobile edge system reference architecture, arranged according to an ETSI Multi-Access Edge Computing (MEC) specification.

FIG. 7 illustrates a mobile edge system reference architecture (or MEC architecture) 700, such as is indicated by ETSI MEC specifications. FIG. 7 specifically illustrates a MEC architecture 700 with MEC hosts 702 and 704 providing functionalities in accordance with the ETSI GS MEC-003 specification. In some aspects, enhancements to the MEC platform 732 and the MEC platform manager 706 may be used for providing specific computing functions within the MEC architecture 700.

Referring to FIG. 7, the MEC network architecture 700 can include MEC hosts 702 and 704, a virtualization infrastructure manager (VIM) 708, an MEC platform manager 706, an MEC orchestrator 710, an operations support system 712, a user app proxy 714, a UE app 718 running on UE 720, and CFS portal 716. The MEC host 702 can include a MEC platform 732 with filtering rules control component 740, a DNS handling component 742, a service registry 738, and MEC services 736. The MEC services 736 can include at least one scheduler, which can be used to select resources for instantiating MEC apps (or NFVs) 726, 727, and 728 upon virtualization infrastructure 722. The MEC apps 726 and 728 can be configured to provide services 730 and 731, which can include processing network communications traffic of different types associated with one or more wireless connections (e.g., connections to one or more RAN (e.g., O-RAN) or telecom-core network entities). The MEC app 705 instantiated within MEC host 704 can be similar to the MEC apps 726-7728 instantiated within MEC host 702. The virtualization infrastructure 722 includes a data plane 724 coupled to the MEC platform via an MP2 interface. Additional interfaces between various network entities of the MEC architecture 700 are illustrated in FIG. 7.

The MEC platform manager 706 can include MEC platform element management component 744, MEC app rules and requirements management component 746, and MEC app lifecycle management component 748. The various entities within the MEC architecture 700 can perform functionalities as disclosed by the ETSI GS MEC-003 specification. In some aspects, the remote application (or app) 750 is configured to communicate with the MEC host 702 (e.g., with the MEC apps 726-7728) via the MEC orchestrator 710 and the MEC platform manager 706.

D. Computing Architectures and Systems

In further examples, any of the computing nodes or devices discussed with reference to the present edge computing systems and environment may be fulfilled based on the components depicted in FIG. 8. Respective edge computing nodes may be embodied as a type of device, appliance, computer, or other “thing” capable of communicating with other edge, networking, or endpoint components. For example, an edge compute node may be embodied as a personal computer, server, smartphone, a mobile compute device, a smart appliance, an in-vehicle compute system (e.g., a navigation system), a self-contained device having an outer case, shell, user equipment (UE) of a cellular network, cellular base station (e.g., RAN node, eNB, gNB), core network (CN) or components of a CN of a cellular network, etc., or other device or system capable of performing the described functions.

Figure 8:
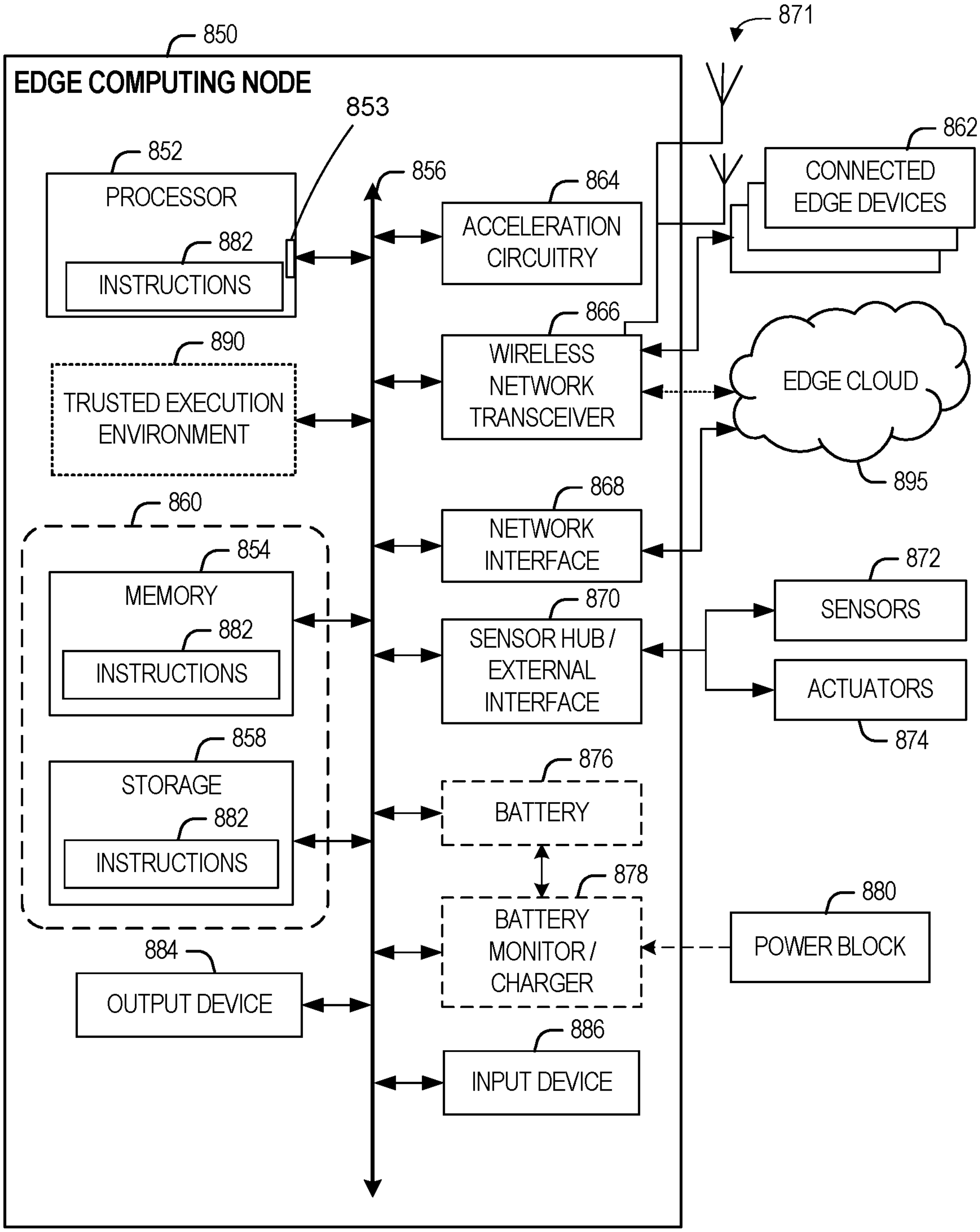
FIG. 8 provides a further overview of example components within a computing device in an edge computing system.

In a more detailed example, FIG. 8 illustrates a block diagram of an example of components that may be present in an edge computing node 850 for implementing the techniques (e.g., operations, processes, methods, and methodologies) described herein. The edge computing node 850 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 850, or as components otherwise incorporated within a chassis of a larger system.

The edge computing node 850 may include processing circuitry in the form of a processor 852, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 852 may be a part of a system on a chip (SoC) in which the processor 852 and other components are formed into a single integrated circuit, or a single package, such as the Edison™ or Galileo™ SoC boards from Intel Corporation, Santa Clara, California. As an example, the processor 852 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-13 processor from Apple® Inc., a Snapdragon™ processor from Qualcomm® Technologies, Inc., or an OMAP™ processor from Texas Instruments, Inc. The processor 852 and accompanying circuitry may be provided in a single socket form factor, multiple socket form factor, or a variety of other formats, including in limited hardware configurations or configurations that include fewer than all elements shown in FIG. 8.

The processor 852 may communicate with a system memory 854 over an interconnect 856 (e.g., a bus) through an interconnect interface 853 of the processor. The interconnect interface 853 may include any input/output connection of the processor 852 that allows the processor 852 to be connected through interconnect 856 to other components of the edge computing node 850. The processor 852 may include one or more processors and/or any type of processing circuitry. Any number of memory devices may be used to provide for a given amount of system memory. As examples, the memory 754 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples, the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 858 may also couple to the processor 852 via the interconnect 856. In an example, the storage 858 may be implemented via a solid-state disk drive (SSDD). Other devices that may be used for the storage 858 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 858 may be on-die memory or registers associated with the processor 852. However, in some examples, the storage 858 may be implemented using a micro hard disk drive (HDD). Further, any number of new technologies may be used for the storage 858 in addition to, or instead of, the technologies described, such resistance change memories, phase change memories, holographic memories, or chemical memories, among others.

The components may communicate over the interconnect 856. The interconnect 856 may include any number of technologies, including industry standard architecture (ISA), extended ISA (EISA), peripheral component interconnect (PCI), peripheral component interconnect extended (PCIx), PCI express (PCIe), or any number of other technologies. The interconnect 856 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 856 may couple the processor 852 to a transceiver 866, for communications with the connected edge devices 862. The transceiver 866 may be coupled to one or more antennas 871 of the edge computing node 850 to enable the edge computing node to wirelessly communicate with other edge computing nodes or other nodes in the wireless edge network. The transceiver 866 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 862. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 866 (or multiple transceivers) may communicate using multiple standards or radios for communications at a different range. For example, the edge computing node 850 may communicate with close devices, e.g., within about 10 meters, using a local transceiver based on Bluetooth Low Energy (BLE), or another low power radio, to save power. More distant connected edge devices 862, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 866 (e.g., a radio transceiver) may be included to communicate with devices or services in a cloud (e.g., an edge cloud 895) via local or wide area network protocols. The wireless network transceiver 866 may be a low-power wide-area (LPWA) transceiver that follows the IEEE 802.15.4, or IEEE 802.15.4g standards, among others. The edge computing node 850 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 866, as described herein. For example, the transceiver 866 may include a cellular transceiver that uses spread spectrum (SPA/SAS) communications for implementing high-speed communications. Further, any number of other protocols may be used, such as Wi-Fi® networks for medium speed communications and provision of network communications. The transceiver 866 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 868 may be included to provide a wired communication to nodes of the edge cloud 895 or to other devices, such as the connected edge devices 862 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 868 may be included to enable connecting to a second network, for example, a first NIC 868 providing communications to the cloud over Ethernet, and a second NIC 868 providing communications to other devices over another type of network.

Given the variety of types of applicable communications from the device to another component or network, applicable communications circuitry used by the device may include or be embodied by any one or more of components 864, 866, 868, or 870. Accordingly, in various examples, applicable means for communicating (e.g., receiving, transmitting, etc.) may be embodied by such communications circuitry.

The edge computing node 850 may include or be coupled to acceleration circuitry 864, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 856 may couple the processor 852 to a sensor hub or external interface 870 that is used to connect additional devices or subsystems. The devices may include sensors 872, such as accelerometers, level sensors, flow sensors, optical light sensors, camera sensors, temperature sensors, global navigation system (e.g., GPS) sensors, pressure sensors, barometric pressure sensors, and the like. The hub or interface 870 further may be used to connect the edge computing node 850 to actuators 874, such as power switches, valve actuators, an audible sound generator, a visual warning device, and the like.

In some optional examples, various input/output (I/O) devices may be present within or connected to, the edge computing node 850. For example, a display or other output device 884 may be included to show information, such as sensor readings or actuator position. An input device 886, such as a touch screen or keypad may be included to accept input. An output device 884 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 850. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 876 may power the edge computing node 850, although, in examples in which the edge computing node 850 is mounted in a fixed location, it may have a power supply coupled to an electrical grid, or the battery may be used as a backup or for temporary capabilities. The battery 876 may be a lithium ion battery, or a metal-air battery, such as a zinc-air battery, an aluminum-air battery, a lithium-air battery, and the like.

A battery monitor/charger 878 may be included in the edge computing node 850 to track the state of charge (SoCh) of the battery 876, if included. The battery monitor/charger 878 may be used to monitor other parameters of the battery 876 to provide failure predictions, such as the state of health (SoH) and the state of function (SoF) of the battery 876. The battery monitor/charger 878 may include a battery monitoring integrated circuit, such as an LTC4020 or an LT7990 from Linear Technologies, an ADT7488A from ON Semiconductor of Phoenix Ariz., or an IC from the UCD90xxx family from Texas Instruments of Dallas, TX. The battery monitor/charger 878 may communicate the information on the battery 876 to the processor 852 over the interconnect 856. The battery monitor/charger 878 may also include an analog-to-digital (ADC) converter that enables the processor 852 to directly monitor the voltage of the battery 876 or the current flow from the battery 876. The battery parameters may be used to determine actions that the edge computing node 850 may perform, such as transmission frequency, mesh network operation, sensing frequency, and the like.

A power block 880, or other power supply coupled to a grid, may be coupled with the battery monitor/charger 878 to charge the battery 876. In some examples, the power block 880 may be replaced with a wireless power receiver to obtain the power wirelessly, for example, through a loop antenna in the edge computing node 850. A wireless battery charging circuit, such as an LTC4020 chip from Linear Technologies of Milpitas, California, among others, may be included in the battery monitor/charger 878. The specific charging circuits may be selected based on the size of the battery 876, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 858 may include instructions 882 in the form of software, firmware, or hardware commands to implement the techniques described herein. Although such instructions 882 are shown as code blocks included in the memory 854 and the storage 858, it may be understood that any of the code blocks may be replaced with hardwired circuits, for example, built into an application specific integrated circuit (ASIC).

In an example, the instructions 882 provided via the memory 854, the storage 858, or the processor 852 may be embodied as a non-transitory, machine-readable medium 860 including code to direct the processor 852 to perform electronic operations in the edge computing node 850. The processor 852 may access the non-transitory, machine-readable medium 860 over the interconnect 856. For instance, the non-transitory, machine-readable medium 860 may be embodied by devices described for the storage 858 or may include specific storage units such as optical disks, flash drives, or any number of other hardware devices. The non-transitory, machine-readable medium 860 may include instructions to direct the processor 852 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 882 on the processor 852 (separately, or in combination with the instructions 882 of the machine readable medium 860) may configure execution or operation of a trusted execution environment (TEE) 890. In an example, the TEE 890 operates as a protected area accessible to the processor 852 for secure execution of instructions and secure access to data. Various implementations of the TEE 890, and an accompanying secure area in the processor 852 or the memory 854 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 850 through the TEE 890 and the processor 852.

E. Machine Readable Medium and Distributed Software Instructions

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Figure 9:
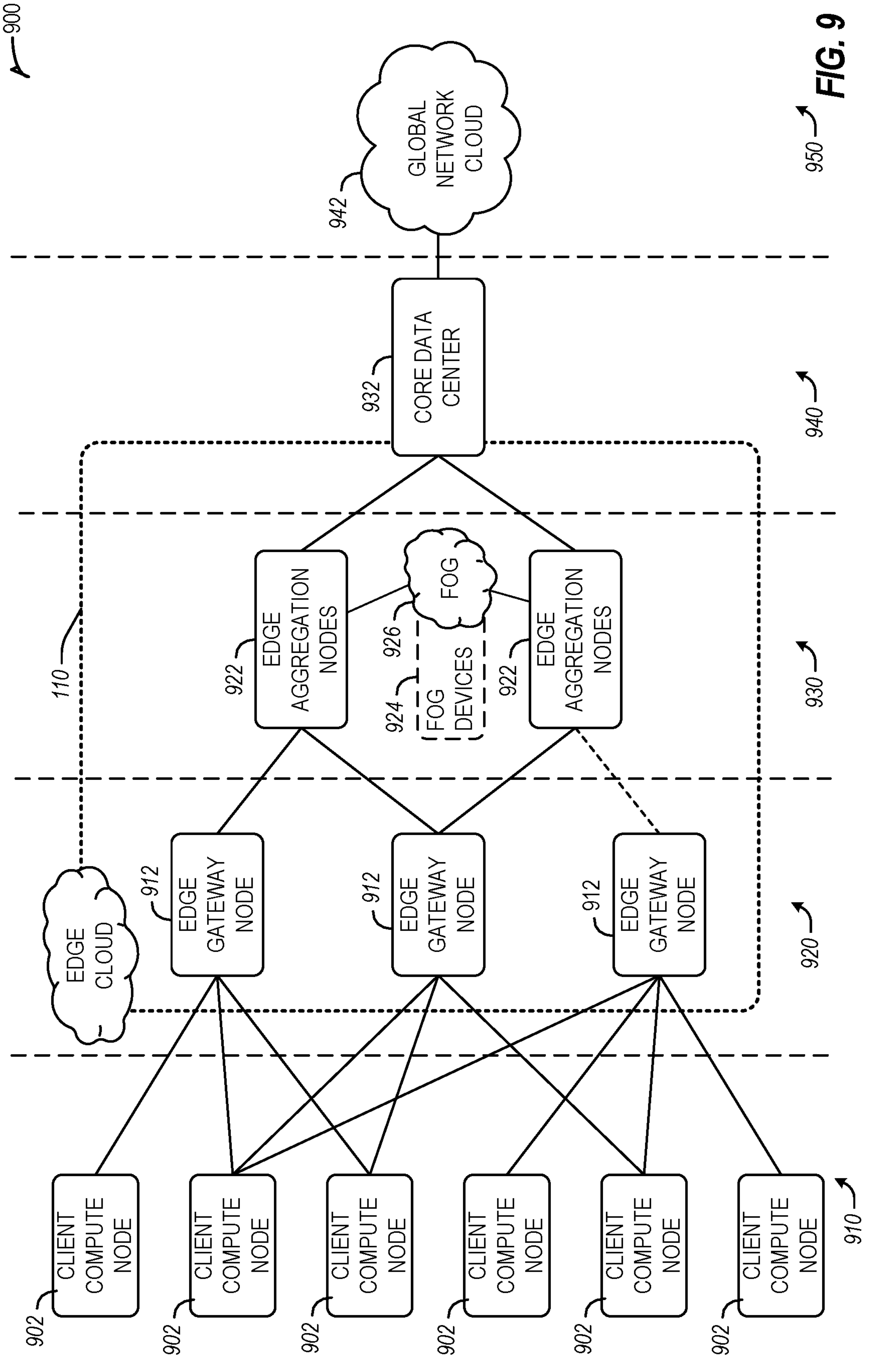
FIG. 9 illustrates an overview of layers of distributed compute deployed among an edge computing system, according to an example.

At a more generic level, an edge computing system may be described to encompass any number of deployments operating in an edge cloud 110, which provide coordination from client and distributed computing devices. FIG. 9 provides a further abstracted overview of layers of distributed compute deployed among an edge computing environment for purposes of illustration.

FIG. 9 generically depicts an edge computing system for providing edge services and applications to multi-stakeholder entities, as distributed among one or more client computing nodes 902, one or more edge gateway nodes 912, one or more edge aggregation nodes 922, one or more core data centers 932, and a global network cloud 942, as distributed across layers of the network. The implementation of the edge computing system may be provided at or on behalf of a telecommunication service provider ("telco", or "TSP"), internet-of-things service provider, cloud service provider (CSP), enterprise entity, or any other number of entities.

Each node or device of the edge computing system is located at a particular layer corresponding to layers 910, 920, 930, 940, 950. For example, the client computing nodes 902 are each located at an endpoint layer 910, while each of the edge gateway nodes 912 are located at an edge devices layer 920 (local level) of the edge computing system. Additionally, each of the edge aggregation nodes 922 (and/or fog devices 924, if arranged or operated with or among a fog networking configuration 926) are located at a network access layer 930 (an intermediate level). Fog computing (or "fogging") generally refers to extensions of cloud computing to the edge of an enterprise's network, typically in a coordinated distributed or multi-node network. Some forms of fog computing provide the deployment of compute, storage, and networking services between end devices and cloud computing data centers, on behalf of the cloud computing locations. Such forms of fog computing provide operations that are consistent with edge computing as discussed herein; many of the edge computing aspects discussed herein are applicable to fog networks, fogging, and fog configurations. Further, aspects of the edge computing systems discussed herein may be configured as a fog, or aspects of a fog may be integrated into an edge computing architecture.

The core data center 932 is located at a core network layer 940 (e.g., a regional or geographically-central level), while the global network cloud 942 is located at a cloud data center layer 950 (e.g., a national or global layer). The use of "core" is provided as a term for a centralized network location—deeper in the network—which is accessible by multiple edge nodes or components; however, a "core" does not necessarily designate the "center" or the deepest location of the network. Accordingly, the core data center 932 may be located within, at, or near the edge cloud 110.

Although an illustrative number of client computing nodes 902, edge gateway nodes 912, edge aggregation nodes 922, core data centers 932, global network clouds 942 are shown in FIG. 9, it should be appreciated that the edge computing system may include more or fewer devices or systems at each layer. Additionally, as shown in FIG. 9, the number of components of each layer 910, 920, 930, 940, 950 generally increases at each lower level (i.e., when moving closer to endpoints). As such, one edge gateway node 912 may service multiple client computing nodes 902, and one edge aggregation node 922 may service multiple edge gateway nodes 912.

Consistent with the examples provided herein, each client computing node 902 may be embodied as any type of end point component, device, appliance, or "thing" capable of communicating as a producer or consumer of data. Further, the label "node" or "device" as used in the edge computing system 900 does not necessarily mean that such node or device operates in a client or agent/minion/follower role; rather, any of the nodes or devices in the edge computing system 900 refer to individual entities, nodes, or subsystems which include discrete or connected hardware or software configurations to facilitate or use the edge cloud 110.

As such, the edge cloud 110 is formed from network components and functional features operated by and within the edge gateway nodes 912 and the edge aggregation nodes 922 of layers 920, 930, respectively. The edge cloud 110 may be embodied as any type of network that provides edge computing and/or storage resources which are proximately located to radio access network (RAN) capable endpoint devices (e.g., mobile computing devices, IoT devices, smart devices, etc., which may be compatible with O-RAN specifications), which are shown in FIG. 9 as the client computing nodes 902. In other words, the edge cloud 110 may be envisioned as an "edge" which connects the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Other types and forms of network access (e.g., Wi-Fi, long-range wireless networks) may also be utilized in place of or in combination with such 3GPP carrier networks.

In some examples, the edge cloud 110 may form a portion of or otherwise provide an ingress point into or across a fog networking configuration 926 (e.g., a network of fog devices 924, not shown in detail), which may be embodied as a system-level horizontal and distributed architecture that distributes resources and services to perform a specific function. For instance, a coordinated and distributed network of fog devices 924 may perform computing, storage, control, or networking aspects in the context of an IoT system arrangement. Other networked, aggregated, and distributed functions may exist in the edge cloud 110 between the cloud data center layer 950 and the client endpoints (e.g., client computing nodes 902). Some of these are discussed in the following sections in the context of network functions or service virtualization, including the use of virtual edges and virtual services which are orchestrated for multiple stakeholders.

The edge gateway nodes 912 and the edge aggregation nodes 922 cooperate to provide various edge services and security to the client computing nodes 902. Furthermore, because each client computing node 902 may be stationary or mobile, each edge gateway node 912 may cooperate with other edge gateway devices to propagate presently provided edge services and security as the corresponding client computing node 902 moves about a region. To do so, each of the edge gateway nodes 912 and/or edge aggregation nodes 922 may support multiple tenancy and multiple stakeholder configurations, in which services from (or hosted for) multiple service providers and multiple consumers may be supported and coordinated across a single or multiple compute devices.

F. Use Case: Satellite Edge Connectivity

Figure 10:
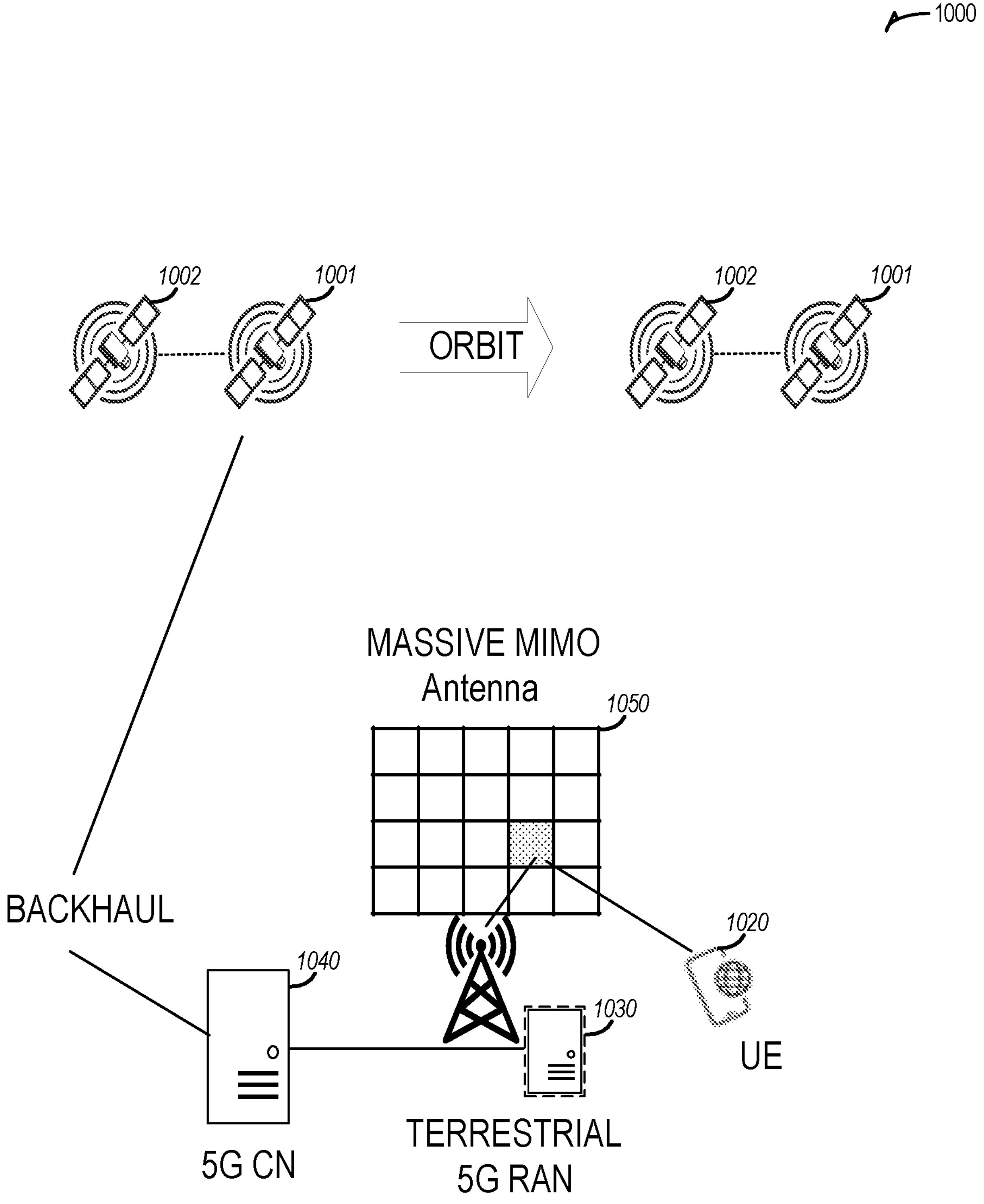
FIG. 10 illustrates network connectivity in non-terrestrial (satellite) and terrestrial (mobile cellular network) settings, according to an example.

FIG. 10 illustrates network connectivity in non-terrestrial (satellite) and terrestrial (mobile cellular network) settings, according to an example. As shown, a satellite constellation may include multiple satellites 1001, 1002, which are connected to each other and to one or more terrestrial networks. Specifically, the satellite constellation is connected to a backhaul network, which is in turn connected to a 5G core network 1040. The 5G core network is used to support 5G communication operations at the satellite network and at a terrestrial 5G radio access network (RAN) 1030. The RAN may be compatible with O-RAN specifications, in certain embodiments.

FIG. 10 also depicts the use of the terrestrial 5G RAN 1030, to provide radio connectivity to a user equipment (UE) 1020 via a massive MIMO antenna 1050. It will be understood that a variety of network communication components and units are not depicted in FIG. 10 for purposes of simplicity. With these basic entities in mind, the following techniques describe ways in which terrestrial and satellite networks can be extended for various edge computing scenarios.

G. Software Distribution

Figure 11:
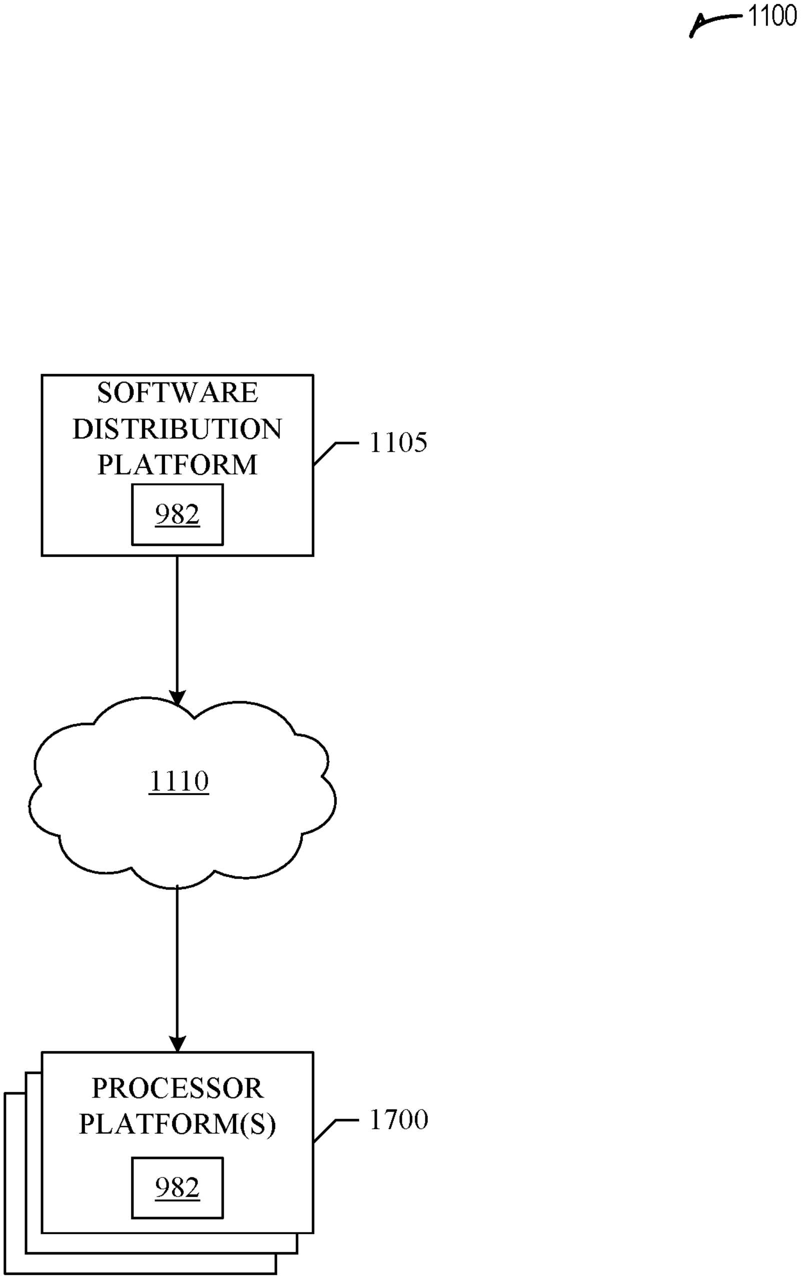
FIG. 11 illustrates an example software distribution platform to distribute software, such as the example computer readable instructions FIG. 8, to one or more devices.

FIG. 11 illustrates an example software distribution platform 1105 to distribute software, such as the example computer readable instructions 882 of FIG. 8, to one or more devices, such as example processor platform(s) 1100 and/or example connected edge devices 862. The example software distribution platform 1105 may be implemented by any computer server, data facility, cloud service, etc., capable of storing and transmitting software to other computing devices (e.g., third parties, the example connected edge devices 862 of FIG. 8). Example connected edge devices may be customers, clients, managing devices (e.g., servers), third parties (e.g., customers of an entity owning and/or operating the software distribution platform 1105). Example connected edge devices may operate in commercial and/or home automation environments. In some examples, a third party is a developer, a seller, and/or a licensor of software such as the example computer readable instructions 882 of FIG. 8. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In the illustrated example of FIG. 11, the software distribution platform 1105 includes one or more servers and one or more storage devices. The storage devices store the computer readable instructions 882. The one or more servers of the example software distribution platform 1105 are in communication with a network 1110, which may correspond to any one or more of the Internet and/or any of the example networks described above. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 882 from the software distribution platform 1105. For example, the software, which may correspond to the example computer readable instructions 882 of FIG. 8, may be downloaded to the example processor platform(s) 1100 (e.g., example connected edge devices), which is/are to execute the computer readable instructions 882 to implement the software instructions. In some examples, one or more servers of the software distribution platform 1105 are communicatively connected to one or more security domains and/or security devices through which requests and transmissions of the example computer readable instructions 882 must pass. In some examples, one or more servers of the software distribution platform 1105 periodically offer, transmit, and/or force updates to the software (e.g., the example computer readable instructions 882 of FIG. 8) to ensure improvements, patches, updates, etc. are distributed and applied to the software at the end user devices.

In the illustrated example of FIG. 11, the computer readable instructions 882 are stored on storage devices of the software distribution platform 1105 in a particular format. A format of computer readable instructions includes, but is not limited to a particular code language (e.g., Java, JavaScript, Python, C, C #, SQL, HTML, etc.), and/or a particular code state (e.g., uncompiled code (e.g., ASCII), interpreted code, linked code, executable code (e.g., a binary), etc.). In some examples, the computer readable instructions 882 stored in the software distribution platform 1105 are in a first format when transmitted to the example processor platform(s) 1100. In some examples, the first format is an executable binary in which particular types of the processor platform(s) 1100 can execute. However, in some examples, the first format is uncompiled code that requires one or more preparation tasks to transform the first format to a second format to enable execution on the example processor platform(s) 1100. For instance, the receiving processor platform(s) 1100 may need to compile the computer readable instructions 882 in the first format to generate executable code in a second format that is capable of being executed on the processor platform(s) 1100. In still other examples, the first format is interpreted code that, upon reaching the processor platform(s) 1100, is interpreted by an interpreter to facilitate execution of instructions.

H. Machine Learning in Edge Computing Networks

Machine learning (ML) involves computer systems using algorithms and/or statistical models to perform specific task(s) without using explicit instructions, but instead relying on patterns and inferences. ML algorithms build mathematical model(s) (referred to as "ML models" or the like) based on sample data (referred to as "training data" or the like) in order to make predictions or decisions without being explicitly programmed to perform such tasks. ML algorithms perform a training process on a relatively large dataset to estimate an underlying ML model. Generally, an ML algorithm may refer to a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure. In some cases, an ML model may include an artificial neural network (NN), which is based on a collection of connected nodes ("neurons") and each connection ("edges") transmit information (a "signal") from one node to other nodes. A neuron that receives a signal processes the signal using an activation function and then signals other neurons based on the processing. Neurons and edges typically have weights that adjust as learning proceeds. The weights may increase or decrease the strength of a signal at a connection.

Linear regression is one type of supervised ML algorithm that is used for classification, stock market analysis, weather prediction, and the like. Gradient descent (GD) algorithms may be used in linear regression. Given a function defined by a set of parameters, a GD algorithm starts with an initial set of parameter values, and iteratively moves toward a set of parameter values that minimize the function. This iterative minimization is achieved by taking steps in the negative direction of the function gradient. In some GD implementations, a model is updated iteratively, where multiplication of large matrices and vectors is performed in each epoch. An epoch may refer to a round of machine learning that is performed in the iterative process of updating a model. Since the training phase for GD algorithms may involve a large amount of iterative computations, running GD algorithms can be computationally intensive. Additionally, computation time bottlenecks rapidly as the model order grows in size.

Distributed computing has been used to reduce training time by offloading GD computations to multiple secondary computing nodes. However, distributing GD computations to heterogeneous computing environments, such as those comprising multiple client or edge devices is difficult because, in most cases, the available edge devices have different configurations, capabilities, and operate under different conditions. Additionally, many of the edge devices communicate using wireless links, which have lower reliability (i.e., in terms of link quality and achievable data rates) when compared to wired links used in server farms. The heterogeneous nature of these computing environments may result in longer lag times at each round of training (or "epoch") due to slower computing devices and/or computing devices with low quality radio links. For these reasons, the conventional distributed ML training approach cannot be straightforwardly applied to heterogeneous computing environments. Recently, federated learning has been proposed for distributed GD computation, where learning takes place by a federation of client computing nodes (which may also be referred to herein as "client devices") that are coordinated by a central server (which may be referred to herein as a MEC server or controller node).

Federated learning, where a global model is trained with coordination with a federation of client computing nodes/client nodes/clients while keeping the training data local at the clients is one of the problems under consideration herein. The federated learning protocol iteratively allows clients to download a centrally trained artificial intelligence/machine-learning model (or model) from a server, such as a MEC server, an edge server or a cloud server, update it with their own data and upload the model updates (such as a gradient update) back to the server. The model updates may include updates weight values for nodes of the NN model, for instance. The server then aggregates updates from multiple clients to update the global model. Federated learning over wireless edge networks is highly desired since data can be maintained local at the clients while the edge server can utilize the compute capabilities of clients to speed up training.

"Global" as used herein in the context of a model or policy is to denote a model or policy that is applicable to and/or based on information pertaining to a plurality of computing nodes within a network of nodes.

I. Cellular Network Architecture Including Core Network

Figure 12:
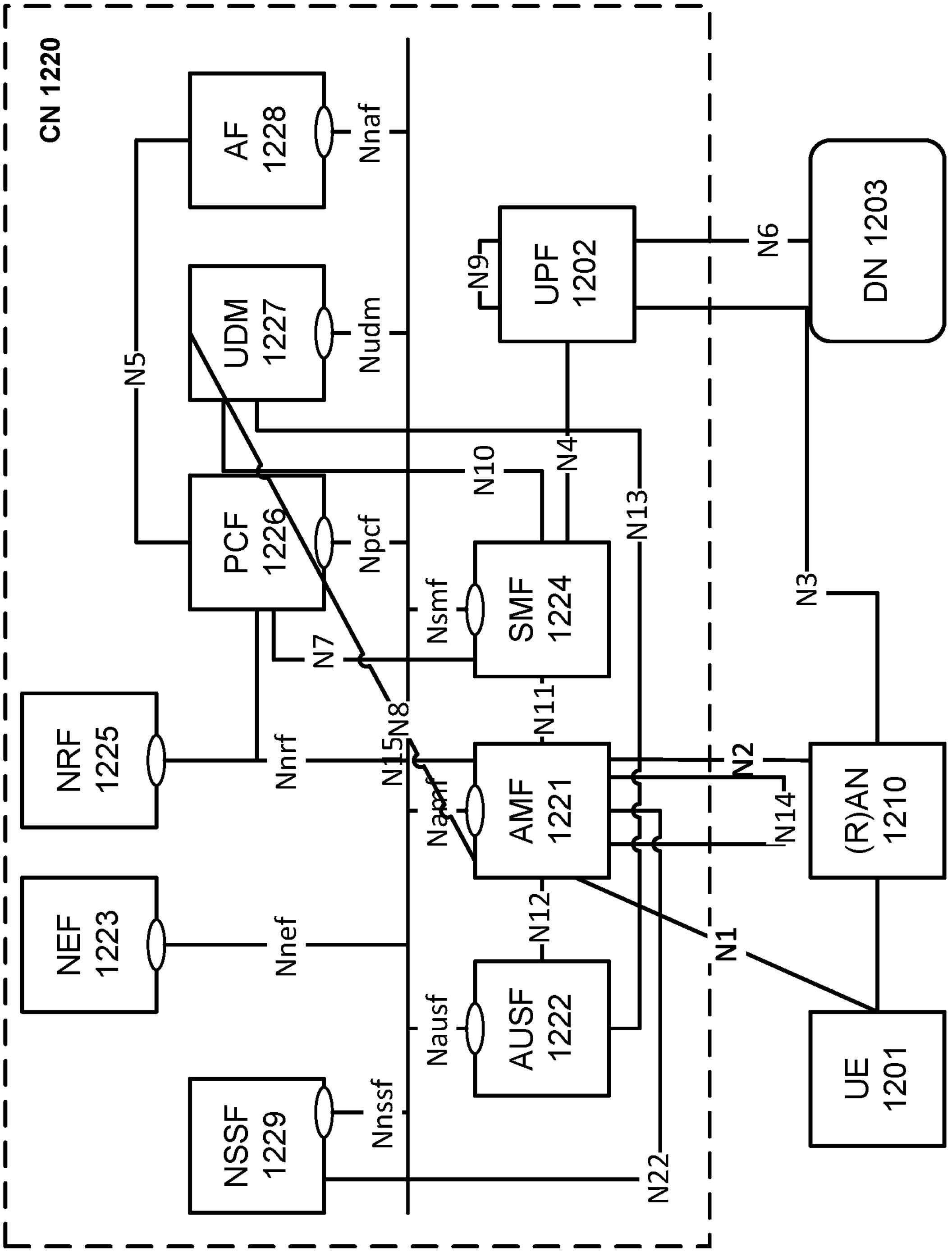
FIG. 12 illustrates an example cellular architecture including a core network (CN).

FIG. 12 illustrates an architecture of a system 1200 including a second CN 1220 in accordance with various embodiments. The system 1200 is shown to include a UE 1201; a (R)AN 1210, and a DN 1203, which may be, for example, operator services, Internet access or 3rd party services; and a 5GC 1220. The 5GC 1220 may include an AUSF 1222; an AMF 1221; a SMF 1224; a NEF 1223; a PCF 1226; a NRF 1225; a UDM 1227; an AF 1228; a UPF 1202; and a NSSF 1229.

The UPF 1202 may act as an anchor point for intra-RAT and inter-RAT mobility, an external PDU session point of interconnect to DN 1203, and a branching point to support multi-homed PDU session. The UPF 1202 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 1202 may include an uplink classifier to support routing traffic flows to a data network. The DN 1203 may represent various network operator services, Internet access, or third party services. DN 1203 may include, or be similar to, application server 130 discussed previously. The UPF 1202 may interact with the SMF 1224 via an N4 reference point between the SMF 1224 and the UPF 1202.

The AUSF 1222 may store data for authentication of UE 1201 and handle authentication-related functionality. The AUSF 1222 may facilitate a common authentication framework for various access types. The AUSF 1222 may communicate with the AMF 1221 via an N12 reference point between the AMF 1221 and the AUSF 1222; and may communicate with the UDM 1227 via an N13 reference point between the UDM 1227 and the AUSF 1222. Additionally, the AUSF 1222 may exhibit an Nausf service-based interface.

The AMF 1221 may be responsible for registration management (e.g., for registering UE 1201, etc.), connection management, reachability management, mobility management, and lawful interception of AMF-related events, and access authentication and authorization. The AMF 1221 may be a termination point for the N11 reference point between the AMF 1221 and the SMF 1224. The AMF 1221 may provide transport for SM messages between the UE 1201 and the SMF 1224, and act as a transparent proxy for routing SM messages. AMF 1221 may also provide transport for SMS messages between UE 1201 and an SMSF (not shown by FIG. 12). AMF 1221 may act as SEAF, which may include interaction with the AUSF 1222 and the UE 1201, receipt of an intermediate key that was established as a result of the UE 1201 authentication process. Where USIM based authentication is used, the AMF 1221 may retrieve the security material from the AUSF 1222. AMF 1221 may also include a SCM function, which receives a key from the SEA that it uses to derive access-network specific keys. Furthermore, AMF 1221 may be a termination point of a RAN CP interface, which may include or be an N2 reference point between the (R)AN 1210 and the AMF 1221; and the AMF 1221 may be a termination point of NAS (N1) signaling, and perform NAS ciphering and integrity protection.

AMF 1221 may also support NAS signaling with a UE 1201 over an N3 IWF interface. The N3IWF may be used to provide access to untrusted entities. N3IWF may be a termination point for the N2 interface between the (R)AN 1210 and the AMF 1221 for the control plane, and may be a termination point for the N3 reference point between the (R)AN 1210 and the UPF 1202 for the user plane. As such, the AMF 1221 may handle N2 signaling from the SMF 1224 and the AMF 1221 for PDU sessions and QoS, encapsulate/de-encapsulate packets for IPSec and N3 tunneling, mark N3 user-plane packets in the uplink, and enforce QoS corresponding to N3 packet marking taking into account QoS requirements associated with such marking received over N2. N3IWF may also relay uplink and downlink control-plane NAS signaling between the UE 1201 and AMF 1221 via an N1 reference point between the UE 1201 and the AMF 1221, and relay uplink and downlink user-plane packets between the UE 1201 and UPF 1202. The N3IWF also provides mechanisms for IPsec tunnel establishment with the UE 1201. The AMF 1221 may exhibit an Namf service-based interface, and may be a termination point for an N14 reference point between two AMFs 1221 and an N17 reference point between the AMF 1221 and a 5G-EIR (not shown by FIG. 12).

The UE 1201 may need to register with the AMF 1221 in order to receive network services. RM is used to register or deregister the UE 1201 with the network (e.g., AMF 1221), and establish a UE context in the network (e.g., AMF 1221). The UE 1201 may operate in an RM-REGISTERED state or an RM-DEREGISTERED state. In the RM-DEREGISTERED state, the UE 1201 is not registered with the network, and the UE context in AMF 1221 holds no valid location or routing information for the UE 1201 so the UE 1201 is not reachable by the AMF 1221. In the RM-REGISTERED state, the UE 1201 is registered with the network, and the UE context in AMF 1221 may hold a valid location or routing information for the UE 1201 so the UE 1201 is reachable by the AMF 1221. In the RM-REGISTERED state, the UE 1201 may perform mobility Registration Update procedures, perform periodic Registration Update procedures triggered by expiration of the periodic update timer (e.g., to notify the network that the UE 1201 is still active), and perform a Registration Update procedure to update UE capability information or to re-negotiate protocol parameters with the network, among others.

The AMF 1221 may store one or more RM contexts for the UE 1201, where each RM context is associated with a specific access to the network. The RM context may be a data structure, database object, etc. that indicates or stores, inter alia, a registration state per access type and the periodic update timer. The AMF 1221 may also store a 5GC MM context that may be the same or similar to the (E)MM context discussed previously. In various embodiments, the AMF 1221 may store a CE mode B Restriction parameter of the UE 1201 in an associated MM context or RM context. The AMF 1221 may also derive the value, when needed, from the UE's usage setting parameter already stored in the UE context (and/or MM/RM context).

CM may be used to establish and release a signaling connection between the UE 1201 and the AMF 1221 over the N1 interface. The signaling connection is used to enable NAS signaling exchange between the UE 1201 and the CN 1220, and comprises both the signaling connection between the UE and the AN (e.g., RRC connection or UE-N3IWF connection for non-3GPP access) and the N2 connection for the UE 1201 between the AN (e.g., RAN 1210) and the AMF 1221. The UE 1201 may operate in one of two CM states, CM-IDLE mode, or CM-CONNECTED mode. When the UE 1201 is operating in the CM-IDLE state/mode, the UE 1201 may have no NAS signaling connection established with the AMF 1221 over the N1 interface, and there may be (R)AN 1210 signaling connection (e.g., N2 and/or N3 connections) for the UE 1201. When the UE 1201 is operating in the CM-CONNECTED state/mode, the UE 1201 may have an established NAS signaling connection with the AMF 1221 over the N1 interface, and there may be a (R)AN 1210 signaling connection (e.g., N2 and/or N3 connections) for the UE 1201. Establishment of an N2 connection between the (R)AN 1210 and the AMF 1221 may cause the UE 1201 to transition from CM-IDLE mode to CM-CONNECTED mode, and the UE 1201 may transition from the CM-CONNECTED mode to the CM-IDLE mode when N2 signaling between the (R)AN 1210 and the AMF 1221 is released.

The SMF 1224 may be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM may refer to management of a PDU session, and a PDU session or "session" may refer to a PDU connectivity service that provides or enables the exchange of PDUs between a UE 1201 and a data network (DN) 1203 identified by a Data Network Name (DNN). PDU sessions may be established upon UE 1201 request, modified upon UE 1201 and 5GC 1220 request, and released upon UE 1201 and 5GC 1220 request using NAS SM signaling exchanged over the N1 reference point between the UE 1201 and the SMF 1224. Upon request from an application server, the 5GC 1220 may trigger a specific application in the UE 1201. In response to receipt of the trigger message, the UE 1201 may pass the trigger message (or relevant parts/information of the trigger message) to one or more identified applications in the UE 1201. The identified application(s) in the UE 1201 may establish a PDU session to a specific DNN. The SMF 1224 may check whether the UE 1201 requests are compliant with user subscription information associated with the UE 1201. In this regard, the SMF 1224 may retrieve and/or request to receive update notifications on SMF 1224 level subscription data from the UDM 1227.

The SMF 1224 may include the following roaming functionality: handling local enforcement to apply QoS SLAs (VPLMN); charging data collection and charging interface (VPLMN); lawful intercept (in VPLMN for SM events and interface to LI system); and support for interaction with external DN for transport of signaling for PDU session authorization/authentication by external DN. An N16 reference point between two SMFs 1224 may be included in the system 1200, which may be between another SMF 1224 in a visited network and the SMF 1224 in the home network in roaming scenarios. Additionally, the SMF 1224 may exhibit the Nsmf service-based interface.

The NEF 1223 may provide means for securely exposing the services and capabilities provided by 3GPP network functions for third party, internal exposure/re-exposure, Application Functions (e.g., AF 1228), edge computing or fog computing systems, etc. In such embodiments, the NEF 1223 may authenticate, authorize, and/or throttle the AFs. NEF 1223 may also translate information exchanged with the AF 1228 and information exchanged with internal network functions. For example, the NEF 1223 may translate between an AF-Service-Identifier and an internal 5GC information. NEF 1223 may also receive information from other network functions (NFs) based on exposed capabilities of other network functions. This information may be stored at the NEF 1223 as structured data, or at a data storage NF using standardized interfaces. The stored information can then be re-exposed by the NEF 1223 to other NFs and AFs, and/or used for other purposes such as analytics. Additionally, the NEF 1223 may exhibit an Nnef service-based interface.

The NRF 1225 may support service discovery functions, receive NF discovery requests from NF instances, and provide the information of the discovered NF instances to the NF instances. NRF 1225 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 1225 may exhibit the Nnrf service-based interface.

The PCF 1226 may provide policy rules to control plane function(s) to enforce them, and may also support unified policy framework to govern network behaviour. The PCF 1226 may also implement an FE to access subscription information relevant for policy decisions in a UDR of the UDM 1227. The PCF 1226 may communicate with the AMF 1221 via an N15 reference point between the PCF 1226 and the AMF 1221, which may include a PCF 1226 in a visited network and the AMF 1221 in case of roaming scenarios. The PCF 1226 may communicate with the AF 1228 via an N5 reference point between the PCF 1226 and the AF 1228; and with the SMF 1224 via an N7 reference point between the PCF 1226 and the SMF 1224. The system 1200 and/or CN 1220 may also include an N24 reference point between the PCF 1226 (in the home network) and a PCF 1226 in a visited network. Additionally, the PCF 1226 may exhibit an Npcf service-based interface.

The UDM 1227 may handle subscription-related information to support the network entities' handling of communication sessions, and may store subscription data of UE 1201. For example, subscription data may be communicated between the UDM 1227 and the AMF 1221 via an N8 reference point between the UDM 1227 and the AMF. The UDM 1227 may include two parts, an application FE and a UDR (the FE and UDR are not shown by FIG. 12). The UDR may store subscription data and policy data for the UDM 1227 and the PCF 1226, and/or structured data for exposure and application data (including PFDs for application detection, application request information for multiple UEs 1201) for the NEF 1223. The Nudr service-based interface may be exhibited by the UDR 1221 to allow the UDM 1227, PCF 1226, and NEF 1223 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. The UDR may interact with the SMF 1224 via an N10 reference point between the UDM 1227 and the SMF 1224. UDM 1227 may also support SMS management, wherein an SMS-FE implements the similar application logic as discussed previously. Additionally, the UDM 1227 may exhibit the Nudm service-based interface.

The AF 1228 may provide application influence on traffic routing, provide access to the NCE, and interact with the policy framework for policy control. The NCE may be a mechanism that allows the 5GC 1220 and AF 1228 to provide information to each other via NEF 1223, which may be used for edge computing implementations. In such implementations, the network operator and third party services may be hosted close to the UE 1201 access point of attachment to achieve an efficient service delivery through the reduced end-to-end latency and load on the transport network. For edge computing implementations, the 5GC may select a UPF 1202 close to the UE 1201 and execute traffic steering from the UPF 1202 to DN 1203 via the N6 interface. This may be based on the UE subscription data, UE location, and information provided by the AF 1228. In this way, the AF 1228 may influence UPF (re)selection and traffic routing. Based on operator deployment, when AF 1228 is considered to be a trusted entity, the network operator may permit AF 1228 to interact directly with relevant NFs. Additionally, the AF 1228 may exhibit an Naf service-based interface.

The NSSF 1229 may select a set of network slice instances serving the UE 1201. The NSSF 1229 may also determine allowed NSSAI and the mapping to the subscribed S-NSSAIs, if needed. The NSSF 1229 may also determine the AMF set to be used to serve the UE 1201, or a list of candidate AMF(s) 1221 based on a suitable configuration and possibly by querying the NRF 1225. The selection of a set of network slice instances for the UE 1201 may be triggered by the AMF 1221 with which the UE 1201 is registered by interacting with the NSSF 1229, which may lead to a change of AMF 1221. The NSSF 1229 may interact with the AMF 1221 via an N22 reference point between AMF 1221 and NSSF 1229; and may communicate with another NSSF 1229 in a visited network via an N31 reference point (not shown by FIG. 12). Additionally, the NSSF 1229 may exhibit an Nnssf service-based interface.

As discussed previously, the CN 1220 may include an SMSF, which may be responsible for SMS subscription checking and verification, and relaying SM messages to/from the UE 1201 to/from other entities, such as an SMS-GMSC/IWMSC/SMS-router. The SMS may also interact with AMF 1221 and UDM 1227 for a notification procedure that the UE 1201 is available for SMS transfer (e.g., set a UE not reachable flag, and notifying UDM 1227 when UE 1201 is available for SMS).

The CN 120 may also include other elements that are not shown by FIG. 12, such as a Data Storage system/architecture, a 5G-EIR, a SEPP, and the like. The Data Storage system may include a SDSF, an UDSF, and/or the like. Any NF may store and retrieve unstructured data into/from the UDSF (e.g., UE contexts), via N18 reference point between any NF and the UDSF (not shown by FIG. 12). Individual NFs may share a UDSF for storing their respective unstructured data or individual NFs may each have their own UDSF located at or near the individual NFs. Additionally, the UDSF may exhibit an Nudsf service-based interface (not shown by FIG. 12). The 5G-EIR may be an NF that checks the status of PEI for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 12 for clarity. In one example, the CN 1220 may include an Nx interface, which is an inter-CN interface between the MME (e.g., MME 221) and the AMF 1221 in order to enable interworking between CN 1220 and CN 220. Other example interfaces/reference points may include an N5g-EIR service-based interface exhibited by a 5G-EIR, an N27 reference point between the NRF in the visited network and the NRF in the home network; and an N31 reference point between the NSSF in the visited network and the NSSF in the home network.

J. Mechanism to Implement a Per Data Packet Quality of Service Requirement in a Communication Network As mentioned previously, in a current 5G network, all packets within a same flow are expected to be treated with the same QoS treatment. The current state of the art does not allow, within a same flow, for a 5G network to change a QoS priority of a flow, or to change a QoS priority as between packets in a same flow.

Some embodiments provide a mechanism to enable a 5G network to determine a QoS treatment (or requirement) on a per packet basis based on an application to be executed within the 5G network. According to some embodiments, intermediate entities of a cellular network, such as any physical or virtual component of a CN (e.g. a UPF), or such as a RAN node (e.g. a gNB), or other intermediate node within a 5G network architecture may include a functionality to allow them to determine a QoS requirement for a transmission based on the application associated with the transmission. The determination of the QoS requirement in this manner may allow a gNB to assign radio resources by using the determined QoS requirement as a parameter.

As used herein, an "intermediate entity" is any entity of a communication network, which is to relay data to another entity of the communication network. Where, for example, a first UE is to relay data to a second UE in a device to device or relay capacity, the first UE may be considered an "intermediate entity" as used herein. An intermediate entity may be an edge computing node. An intermediate entity may be embodied as hardware and/or software. For example, in a cellular network, such as a 5G network, an intermediate entity may include any of the functionalities of the core network, such as virtualized functionalities, for example in the form of any of a UPF, a SMF, an AMF, a PCF, a UDM, an AF, a NSSF, a NEF, a NRF a RAN node or any of the components, whether or not virtualized, on a cellular network, as will be explained by way of example in the context of FIG. 12 below.

As used herein, a "communication network" may be any network, whether wired and/or wireless, where communication takes place between the network nodes/entities. A communication network may, for example, include an edge network, a cloud network, a cellular network, etc. Although examples in the context of FIGS. 13-16 are provided in the context of a 5G network, embodiments are not so limited, and pertain to any communication network as would be understood by a person of ordinary skill.

Known solutions for assigning QoS requirements to packet or data transmissions in a network have already been described above. The known solutions however come with their own particular disadvantages, as will be enumerated below.

For example, modifying a 5QI in a 5G deployment by using a PDU Modification Session can be quite time-consuming, and can unduly affect performance in the context of execution of an application. The latter is especially true if the modification occurs too late or even causes the existing connection to break due to a change in service flow parameters across the network.

For the existing solution that enables a RAN node to get from a CN multiple QoS levels which can then be mapped to a session, this solution allows a network to adapt to the changing environment by configuring multiple QoS levels within a given session, but it still treats all the packets within the same flow at the same QoS level. The DiffServ method has been in existence for a very long time, yet it has not been utilized effectively due to the overhead it bring about in changing the implementation of a DiffServ field in every intermediate router/gateway within the internet. It also requires modifying existing applications to make use of the field, which is difficult to do. In addition, it hands control of network resources to the application which may mark packets as high priority by default thus leading to worse problems as truly higher priority applications contend with the lower-priority applications.

The DPI method can be utilized only if the network has an intimate knowledge of the application protocols. This is not scalable for all applications as applications modify or evolve and newer applications come into being. The DPI solution also fails to account for encryption of application protocol headers and the overhead of decrypting them for purposes of inspection and then encrypting them back again, which may not be feasible to do in some cases, and may also presents a security risk.

In certain applications, such as video streaming, augmented reality/virtual reality (AR/VR), or collaborative robotics, there are cases where the application requirements on the Quality of Service (QoS) may change dynamically over the application session duration. For instance, in video applications, there are different types of frames i.e. I, B and P-type frames. It is far more important for the I-frames to be delivered reliably than the B or P-frames, because the I-frames carry the most information and the loss of such frames would typically result in significant loss in video quality, whereas the other type of frames carry incremental information and thus, their loss is less significant. There are further distinctions within each frame type as well, which can make two packets within a same frame have different priorities. In addition, in low latency applications, such as AR/VR applications, given their very strict latency requirements, there may not be enough bandwidth available if there are a lot of streams running at the same time and/or if network congestion occurs. In such a case, it may be best to prioritize some streams and/or specific packets over others.

Similarly, in collaborative robotics, there are certain packets that need to be delivered with much more precise latency compared to others, depending on the function and type of the robot on a factory floor. There are cases where missing the latency deadline for certain packets may not affect performance to an appreciable degrees, whereas missing the latency deadline for other packets may be detrimental.

However, as noted previously, in 5G systems, the mechanism for ensuring QoS is designed to be on a per-flow basis. This means that a set of QoS metrics, such as reliability and latency, is associated with all the packets in the flow, and is regarded as the same for all packets in a flow, even though those packets may belong to different applications which may need to have different QoS requirements, and even though the packets for a given application may also need to have different QoS requirements. Thus, in times of congestion, all packets within an application would, according to the state of the art, be treated similarly, leading to loss of critical packets and/or potential waste of bandwidth over falsely prioritized packets.

The state of the art fails to provide a mechanism to allow for per-packet QoS level of classification at the network layers or below.

Another example in 5G systems is that multiple service data flows might be mapped to the same QoS flow based on some pre-defined packet filters. For example, both an AR/VR service data flow and a video gaming service data flow may be mapped to one QoS flow, where both service data flows are given the same QoS level. In the event of network congestion, both services (e.g. AR/VR and video gaming) are treated similarly, potentially leading to packet loss even if the AR/VR may have higher priority from the user's perspective.

Embodiments rely on the insight that an application may be the best arbiter of the QoS that may be needed on a per packet basis for its associated packets, and further on the insight that intermediate entities or nodes, such as a UPF or gNB, because they use software, network function virtualization and/or container technology, may provide a convenient and effective environment for deploying a software based solution to a QoS problem where a QoS may need to be customized per packet and not necessarily only per flow.

Some embodiments provide an apparatus of an edge computing node, the apparatus including an input, an output, and one or more processors coupled between the input and the output, the one or more processors to: receive a plurality of service data flows (SDFs) associated with respective applications to be executed, the SDFs including data packets;

determine first Quality of Service (QOS) flows corresponding to a plurality of first QoS requirements for the SDFs, wherein SDFs associated with a same application correspond to a same QoS requirement of the plurality of first QoS requirements; change the first QoS flows to second QoS flows different from the first QoS flows, the second QoS flows corresponding to a plurality of second QoS requirements for respective ones of the SDFs, the second QoS flows based on the respective applications and further based on respective ones of the data packets; and send for transmission from the output the plurality of SDFs based on the second QoS flows.

According to some embodiments, a solution to the problem of dynamic packet level QoS is to allow an application-specific microservice to be deployed at the network layer at some or all of the intermediate entities that perform the task of packet level QoS classification for that specific application. Thus, instead of the network (e.g. RAN node) performing this task using its own hardware or software by applying a given QoS classification to all applications in a flow, which is not only disadvantageous to performance but also difficult to scale, an application is to provide a dedicated "QoS microservice" for deployment at the network layer, that is, a microservice that allows a QoS requirement to be associated with that particular application alone by a network layer within which the QoS microservice has been deployed.

For example, according to an embodiment, at the time of the application's deployment within a communication network, the microservice may be downloaded at one or more intermediate entities of the communication network to make possible a determination of packet-level QoS.

In this manner, the QoS microservice may be deployed within the network function pipeline. According to an embodiment, a QoS microservice may be used to perform DPI for a specific application. Because the microservice is provided by the application itself, it knows how to decode a QoS requirement on a per packet basis, and is not constrained by having to possess the knowledge for example of where, in a given packet header, QoS information may have been encoded, as in the case of one of the aforementioned solutions of the state of the art.

Some embodiments contemplate a specific feature added to the packet processing pipeline of one or more intermediate entities, such as a gNB or a UPF, or any intermediate router in a network. This specific feature may be referred to as "Dynamic packet-based traffic shaping microservice for App X" etc. The microservice may be dynamic for example because it may be triggered based on certain criteria, such as network traffic conditions/available network resources, etc.

The microservice installation/uninstallation procedure may be detected by various network tools. An agreement between a network provider and an application service may provide a packet inspection QoS microservice according to an embodiment. Further, any charging information to users for use of the QoS microservice could show the presence and use of QoS microservice.

Embodiments rely on three parts as set forth below:

1. Association of a microservice with an application, where, to begin with, a specific microservice is associated with a specific application.
2. Deployment of the microservice within a network function pipeline, where the microservice gets deployed within the communication network at one or more specific intermediate network entities. For example in a 5G network, the microservice may be deployed (i.e., be made available for use) within the UPF, at the gNB, or at intermediate routers, depending on the application and deployment type such as a private 5G network for industrial automation or a more public telecommunications network.
3. Dynamic microservice functionality, where, after the microservice is deployed and mapped to the input and output requirements of the network processing pipeline and is actively being used to perform packet-level QoS determination.

The above three parts of embodiments will be described below in further detail.

Association of a Microservice with an Application:

The application server associates the QoS microservice with an application in order to this information is already part of the 5G network. This may occur at the time an application server initially communicates with an entity of the communication network, for example with a CN for subscription/QoS information setup. By "subscription," what is meant here is deployment, which will be described below.

With respect to application servers (AS'), in a 5G network, internet/intranet connectivity are supported, granting a transport path from a 5G UE to one or more AS external and/or internal to the 5G network. Operators of 5G networks may run their own internal AS' in order to offer services like SMS or Voice over IP. In addition, transport paths have recently emerged for various low-latency services that require AS' that are physically placed close to the UEs in order to minimize the transfer delay. In the 5G environment there may be quite a number of AS' deployed at, or very close to, the gNB sites. Locally placed AS' can utilise the ETSI-defined concept of MEC, Multi-Access Edge Computing, and can in turn be the tool to realize Local Area Data Networks, LADN, as defined by the 3GPP.

According to some embodiments, UEs at which a client is to use results of execution of an application (such as a AR/VR application, a video streaming application, actuation of a robot arm, etc.) does not have to explicitly know that a given application has a microservice associated with it. The software-based configuration that associates a QoS microservice with a specific application is performed in advance at an AS that is internal to or external to the 5G network as part of a setup of the application. Association at the AS concerns a mapping of the QoS microservice with a specific application. It represents a service level agreement (SLA) between the application provider and the 5G network provider, with the QoS microservice allowing a determination, within the 5G network, of respective QoS requirement to be applied to individual packets associated with an application.

Thus, the AS provides, by way of the microservice, the packet filter and trigger criteria information to the 5G network so that when the UE initiates execution of the corresponding application, the 5G network will, during the dynamic microservice functionality stage (part 3 of embodiments as enumerated above) match the application's packet flow info to the packet filter info according to the mapping (i.e., association) and if there is a match, will know to automatically apply the microservice to the packet flow on a per packet basis.

Trigger criteria may include any information that may allow the network to determine whether and or how to deploy and/or use the microservice. For example, trigger criteria may be based on currently available resources at the network (e.g., whether a criterion for network congestion is met), based on a use schedule of the microservice (e.g., intermittently, such as based on a set periodic use schedule or another predetermined use schedule or a random use schedule (e.g., for load balancing purposes), or all the time), or based on a use case of the individual packets associated with an application. For example, where the currently available resources suggest network congestion, the microservice may be triggered for further triage packets based on per packet QoS requirements that it provides for a given application until the congestion is resolved. For example, where one set of AR/VR packets is associated with a healthcare use case, and another set of AR/VR packets is associated with a video gaming use case, the trigger criteria may assign data packets related to the healthcare use case of the AR/VR identified application to a higher priority QoS requirement. There may be one or more first trigger criteria for deploying a microservice, and one or more second trigger criteria for using (executing) a microservice.

Deployment of the Microservice within the Network Function Pipeline:

The microservice may get deployed (e.g., uploaded/downloaded/made available for later use) within the network at one or more specific intermediate entities. For example in a 5G network, deployment could be within the UPF or at the RAN layer or intermediate routers, depending on the application and deployment type such as a private 5G network for industrial automation or a more public telco network.

As noted previously, the AS may in addition provide triggering criteria to install/start the microservices, i.e., whether the microservice is intended for use only during congestion or all the time or intermittently for load balancing purposes etc., which we assume is also communicated to the network at the time of setup as part of information associated with the microservice. The network downloads, during deployment, the microservice within its packet processing pipeline.

The packet filter may include, for example, five tuple information to indicate for example an application to be executed. The five tuple information may include, for example, source IP address, source port, type of transport (e.g., protocol), destination IP address, destination port information. The five tuple information of the packet filter may also include "type of service" information to identify the service (i.e., application) that is associated with individual incoming packets.

Two embodiments are described below for the deployment of a QoS microservices.

According to a first embodiment, a QoS microservice may be deployed at an intermediate node of a 5G network by default, that is, it is to be deployed when the application flow is being established within the network. The latter ensures that whenever a trigger criterion takes place (which may be upon a call to execute a given application associated with the workload, or which may include any trigger criterion including a call to execute the given application plus one or more other trigger criteria), the intermediate entity is ready to execute the microservice to determine a QoS requirement for each packet associated with the application.

According to a second embodiment, a QoS microservice may be deployed at an intermediate node of a 5G network on-demand and/or only when necessary, that is, only when one or more triggering criteria are met for deployment, at which time the microservice is identified and deployed at the intermediate node.

The first embodiment allows a relative quick response to a trigger criterion as compared with the second one, but it may be more resource-intensive on hardware and software.

Dynamic Micro-Service Functionality:

Dynamic microservice functionality is implemented at an intermediate node according to some embodiments after deployment of a QoS microservice, including its mapping to the input and output requirements of the network processing pipe. The Dynamic microservice functionality may be implemented by using the microservice to perform packet-level QoS under trigger criteria for use of the microservice are met.

Installation (deployment) and/or activation (use) of the microservice could be triggered when some predefined condition(s) is/are satisfied by way of one or more triggering criteria. Activation of the microservice within the packet processing pipeline may, in addition, in some cases, be a matter of choice of the intermediate entity where it is downloaded, that is, independent of the triggering criteria.

Figure 13:
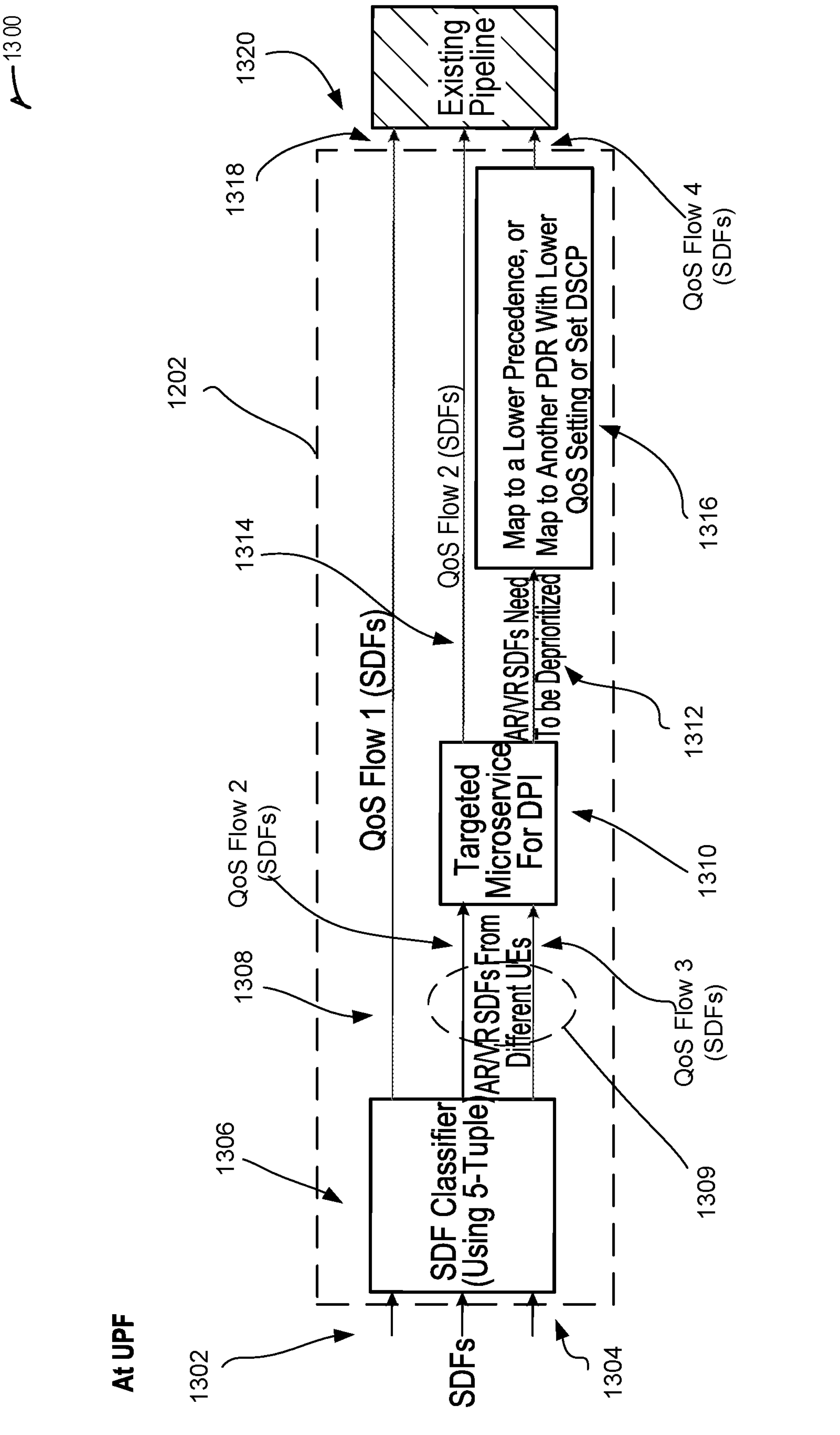
FIG. 13 illustrates a flow to implement a QoS microservice at a UPF according to a first embodiment.
Figure 14:
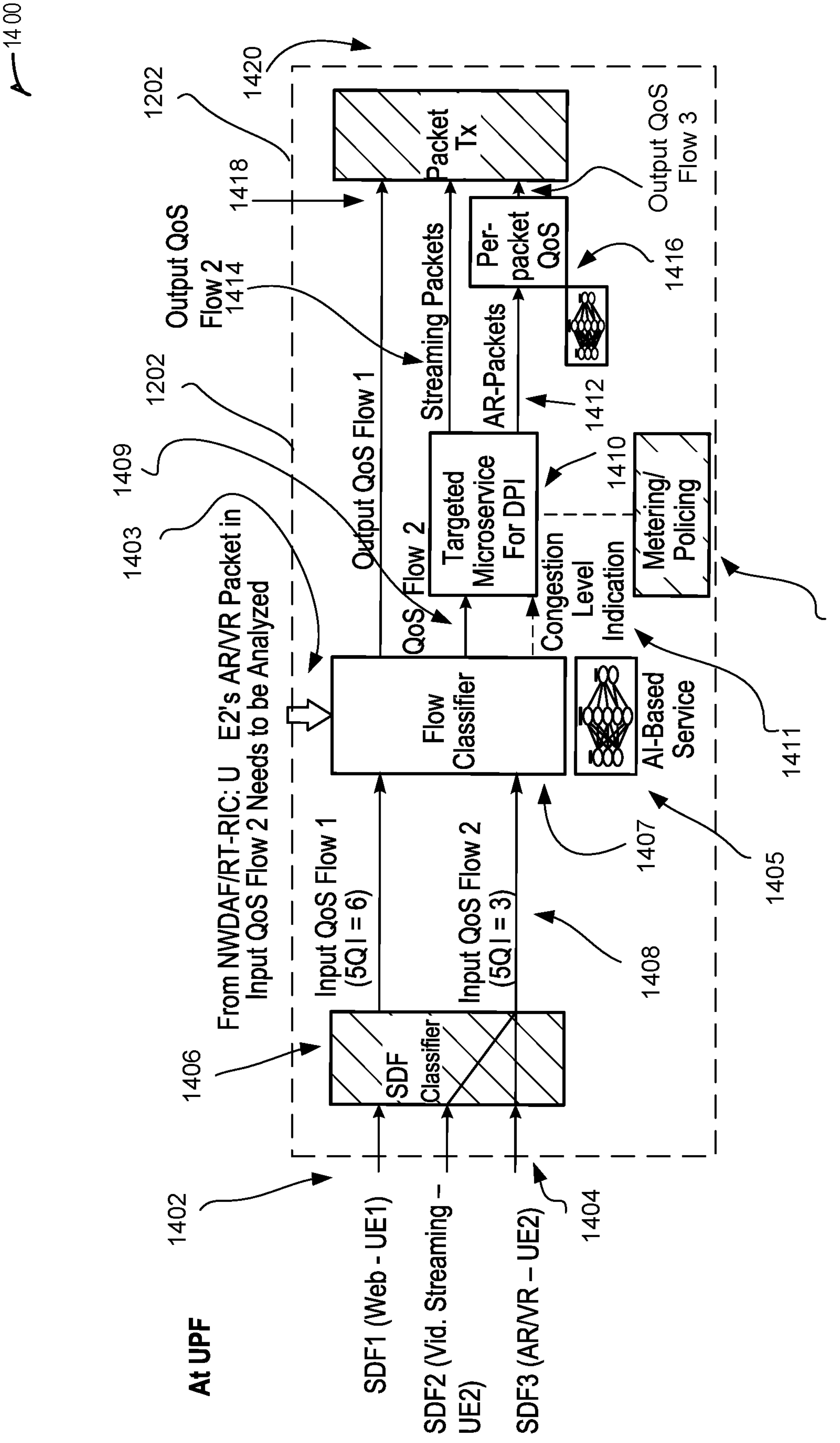
FIG. 14 illustrates a flow to implement a QoS microservice at a UPF according to a second embodiment.

A description of some embodiments will now be set forth in relation to FIGS. 13 through 16 below. FIGS. 13 and 14 relate to implementation of a QoS microservice at a UPF, while FIGS. 15 and 16 relate to implementation of a QoS microservice at a gNB.

FIG. 13 depicts a flow 1300 to be implemented at a UPF 1202, corresponding for example to UPF 1202 of FIG. 12 described above. In flow 1300, service data flows (SDFs—data flows associated with one or more services, where an individual service is based on a corresponding application) 1302 are received at the UPF 1202, for example from different UEs, through a RAN by way of a N3 interface. The output 1318 of the UPF 1202 may be to a DN by way of a N6 interface. The DL direction for the communication of SDFs to various UEs will be in the opposite direction.

The UPF 1202 is to perform many functions as explained in more detail with respect to FIG. 12, including QoS handling for a user plane (e.g., packet filtering, gating, UL/DL rate enforcement). Individual ones of the SDFs 1302 of FIG. 13 may correspond to separate applications, such as, for example, AR/VR SDFs, and/or be from different UEs. The applications may, for example, include a Whatsapp video application, a Skype video application, a Youtube streaming application, a Netflix streaming application, a healthcare related application, a robotics related application, an entertainment related application, to name some examples. These SDFs 1302 are provided to an input 1304 of UPF 1202 and routed at the UPF to a SDF Classifier 1306, corresponding to logic to implement a classification of the incoming SDFs 1302. The SDFs may each include 5 tuple information, including information to indicate respective applications associated with respective data packets of the SDFs. The SDF Classifier logic 1306, based on an identification of applications corresponding to respective packets of the SDFs, classifies the SDFs by mapping the packets therein to QoS flows 1308 based on SDF classification rules provided by a SMF, such as SMF 1224 of FIG. 12, on a per flow basis. The SDF classification rules may correspond to a SDF template regarding per flow QoS requirements such as those currently existing in the state of the art. SDF template information may for example be provided to the UPF 1202 by way of a N4 interface from the SMF.

SDF Classifier 1306 may thus provide a first (rough) classification of the SDFs 1302 based on existing QoS traffic templates available at the UPF 1202 to create the three shown input QoS flows 1308 including input QoS flow 1, QoS flow 2, and QoS flow 3. Each input QoS flow may include one or more SDF flows, and may correspond to a distinct QoS policy/QoS requirement.

The Targeted Microservice for DPI logic (TMD) logic 1310 may, according to an embodiment, correspond to a first functionality of one or more QoS microservices, each of the QoS microservices corresponding to an application to be executed. In the shown example, UPF 1202 is to direct SDFs corresponding to AR/VR applications to the TMD logic 1310, meaning that, for an AR/VR application for which SDFs are routed to the UPF 1202, there would be an associated microservice to be deployed at the UPF 1202, subject to possible other trigger criteria (not shown in FIG. 13).

TMD logic 1310 provides, according to an embodiment, a mechanism to determine QoS policy at a packet level granularity within a SDF, rather than at a flow level granularity as is true in the state of the art.

TMD logic 1310 may perform analysis of data packets within SDFs of one or more of the input QoS flows 1308. The data packets 1309 to be analyzed by way of TMD logic 1310 ("data packets to be analyzed") correspond to those data packets associated with applications for which a QoS microservice has been deployed within UPF 1202. The TMD logic 1310 is to determine, among the data packets to be analyzed 1309, first data packets 1312 for which the existing QoS requirements (as indicated by the respective input QoS flows of the first data packets) ought to be changed, and second data packets 1314 for which the exiting QoS requirements (as indicated by the respective input QoS flows of the second data packets) ought to remain unchanged. TMD logic 1310 may classify the data packets 1309 into first and second data packets 1312 and 1314 not only based on a determination by the UPF 1202 that data packets 1309 are associated with one or more AR/VR applications, but further based on other trigger criteria, such as, for example, a type or additional feature of AR/VR data packet, that is, based on a distinction between data packets that correspond to a same application. For example, where one of the selected AR/VR data packets 1309 is healthcare related, TMD logic 1310 may classify the healthcare related data packet as part of the second data packets for which the existing QoS requirements (e.g. high priority) are to remain unchanged, whereas, where another one of the selected AR/VR data packets is entertainment related, the TMD logic 1310 may classify the entertainment related data packet as part of the first data packets for which the existing QoS requirements (high priority) may be changed. Thus, one or more SDFs from input QoS flow 2 may be moved to output QoS flow 3. Although not shown in FIG. 13, some embodiments also contemplate that TMD logic 1310 may move some SDFs from input QoS flow 3 to output QoS flow 2.

In addition, any of the trigger criteria examples mentioned above may further be superimposed by the TMD logic 1310 in determining how to classify the data packets to be analyzed (not shown in FIG. 13, but described in further detail in relation to FIG. 14 below). For example, the UPF 1202 may route input QoS flows into a TMD logic 1310 only where it determines congestion within the network. The congestion may be defined differently based on application needs.

It is to be understood that, in the context of FIGS. 13-16, reference to "data packets" is meant to refer to data packets within SDFs as shown in the figures.

First data packets 1312 are then routed by UPF 1202 within input QoS flows 1, 2 and 3 to a QoS mapping logic 1316 that may, according to an embodiment, correspond to a second functionality of the same one or more microservices associated with TMD logic 1310. QoS mapping logic 1316 is to change the existing QoS requirement(s) associated with the first data packets as dictated by the particular QoS microservice being implemented. QoS mapping logic 1316, similar to TMD logic 1310, may be triggered to execute a QoS microservice based on additional trigger criteria (not shown in FIG. 13), similar to those provided by way of example above.

As shown in FIG. 13, the QoS mapping logic 1316 may map the first data packets to a lower precedence than that indicated by their existing QoS requirement(s), may map the second data packets to a packet detection rule (PDR) with a lower QoS setting than that of the existing QoS flow of the second data packets, or may set a differentiated services code point (DSCP) for the data packet to change its forwarding treatment. In this manner, whereas SDF Classifier logic 1306 may have mapped the incoming SDFs 1302 into input QoS flows 1, 2 and 3 based on the SDF template stored at the UPF for assigning SDFs to QoS requirements, execution of a QoS microservice according to an embodiment may result in output QoS flows from the UPF that are different from input QoS flows dictated by the SDF template. In the shown embodiment, whereas the input QoS flows (expected by classification using the SMF SDF template) would have resulted in input QoS flows 1, 2 and 3, the output QoS flows from UPF 1202 correspond to output QoS flows 1, 2 and 4. For example, output QoS flow 1 would include SDFs not subjected to TMD logic 1310 (i.e., in this example, non AR/VR SDFs) and would thus correspond to input QoS flow 1, output QoS flow 2 may include SDFs different from those in input QoS flow 2 (for example, it may have less SDFs), and output QoS flow 4 may include SDFs from input QoS flow 3 and possibly also from input QoS flow 2. Output QoS flows 1, 2 and 4 of FIG. 13, collectively representing SDFs 1320, are sent in an existing pipeline for example to a DN as noted above.

Thus, FIG. 13 shows the example usage of a QoS microservice according to an embodiment as implemented in a UPF for example to prioritize specific AR/VR packets, for example to a specific UE or to a number of specific UEs. FIG. 13 is based on the premise that the UPF cannot satisfy all AR/VR services when congestion happens. It needs to deprioritize some AR/VR flows but it doesn't know which flows need to be deprioritized. UPF may install microservices for Packet-level Inspection and traffic shaping which read into the AR/VR packets and filter out the packets that need to be deprioritized, depending on the level of congestion.

Output QoS flows of the embodiment of FIG. 13 would then be routed for packet transmission through an output of the UPF 1202 in a usual manner, as would be recognized by one skilled in the art.

FIG. 14 depicts a flow 1400 to be implemented at a UPF 1202, corresponding for example to UPF 1202 of FIG. 12 described above. Flow 1400 is similar to flow 1300 of FIG. 13, except that the TDM logic is performed using artificial intelligence (AI).

In flow 1400, SDFs 1402 are received at the UPF 1202, for example for transmission to different UEs. The output 1418 of the UPF 1202 may be to a RAN node, such as RAN node 1210 of FIG. 12. The UL direction for the communication of SDFs from various UEs will be in the opposite direction.

Individual ones of the SDFs 1402 of FIG. 14 may correspond to separate applications, such as, for example, SDF1 with associated with a web application to UE1, SDF2 associated with a video streaming application to UE2, and SDF3, associated with an augmented reality (AR) application also to UE2. These SDFs 1402 are provided to an input 1404 of UPF 1202 and routed at the UPF to a SDF Classifier 1406 similar to SDF classifier 1306 of FIG. 13, corresponding to logic to implement a classification of the incoming SDFs 1402. The SDFs may each include 5 tuple information, including information to indicate respective applications associated with respective data packets of the SDFs. The SDF Classifier logic 1406, based on an identification of applications corresponding to respective packets of the SDFs, similar to SDF Classifier logic 1306, classifies the SDFs by mapping the packets therein to QoS flows 1408 based on SDF classification rules provided by a SMF, such as SMF 1224 of FIG. 12, on a per flow basis.

SDF Classifier 1406 may thus provide a first (rough) classification of the SDFs 1402 based on existing QoS traffic templates available at the UPF 1202 to create the two shown input QoS flows 1408 including input QoS flow 1, QoS flow 2, where QoS flow 1 corresponds to a 5QI value 6 and includes SDF1, whereas QoS flow 2 corresponds to 5QI value 3 and includes SDF2 and SDF3.

A "5QI" value as used herein refers to a 5G QoS Identifier, and may denote sets of values for one or more of resource type, priority level, packet delay budget, packet error rate, maximum data burst volume, or averaging window.

In the embodiment of FIG. 14, an AI based Flow Classifier (AIFC) logic 1407 controls a routing of input QoS flows to TMD 1410. TMD 1410 may be similar to TMD 1310 of FIG. 13. AIFC logic may correspond to a first functionality of one or more QoS microservices, each of the QoS microservices corresponding to an application to be executed. AIFC logic 1407 may determine whether or not to route the input QoS flows for deep packet analysis by a TMD logic of a QoS microservice, as will be explained in further detail below.

AIFC logic 1407 may provide an AI-based inference service, such as by an AI based neural network 1405. AIFC logic 1407 may receive instructions 1403 from with respect to which if any input QoS flows to direct for deep packet analysis by the TMD logic 1410 of a QoS microservice deployed at the UPF 1202. Instructions 1403 may for example be from any physical or virtual component within the 5G network. For example, instructions 1403 may be from a Network Data Analytics Function (NWDAF) or from a Real Time RAN Intelligent Controller (RT-RIC). Based on instructions 1403 and input QoS flows it receives, the AI based engine within AIFC logic 1407 may be used to infer best ways in which to reshape QoS traffic. Instructions 1403 may direct the AIFC logic 1407 with respect to which QoS microservice is needed to be installed/activated (i.e., for which service/application), and optionally for which UE.

For example, a NWDAF, defined in 3GPP TS 29.520 incorporates standard interfaces from the service-based architecture to collect data by subscription or request model from other network functions and similar procedures. This is to deliver analytics functions in the network for automation or reporting, solving major custom interface or format challenges. NWDAF may have a distributed architecture providing analytics at the edge in real-time and, a central function for analytics which need central aggregation (e.g., service experience). The NWDAF may thus be deployed within a CN of a 5G network, and may collect data and provides analytics services using a request or subscription model.

For example, a RT-RIC may reside within a telco edge or regional cloud and typically enables network optimization actions. The RT-RIC may reside within a RAN node.

AIFC logic 1407 may, for example, receive instructions 1403 as noted above, along with input QoS flows 1 and 2 from the SDF classifier. In the shown example, the instructions 1403 includes a direction to install or activate a QoS microservice corresponding to AR/VR applications. The AIFC logic 1405 may direct input QoS flow 2 to the TMD 1410 based on the instructions 1403, while directing input QoS flow 1 to the output 1420 as output QoS flow 1.

TMD logic 1410 may be similar to TMD logic 1310 of FIG. 13. According to the shown embodiment of FIG. 14, TMD logic 1410 correspond to a second functionality of one or more QoS microservices, each of the QoS microservices corresponding to an application to be executed. In the shown example, AIFC 1407 is to direct, based on instructions 1403, SDFs corresponding to AR/VR applications to the TMD logic 1410, meaning that, for an AR/VR application for which SDFs are routed to the UPF 1202, there would be an associated microservice deployed or to be deployed at the UPF 1202, subject to possible other trigger criteria.

TMD logic 1410 may perform analysis of data packets within SDFs of one or more of the input QoS flows 1408 based on instructions 1403 provided to the AIFC logic 1407. The data packets 1409 to be analyzed by way of TMD logic 1410 ("data packets to be analyzed") are in fact selected based on instructions 1403, and correspond to data packets associated with applications for which a QoS microservice has been deployed within UPF 1202. The TMD logic 1410 is to perform deep packet analysis to determine, among the data packets to be analyzed 1409, first data packets 1412 for which the existing QoS requirements (as indicated by the respective input QoS flows of the first data packets) ought to be changed, and second data packets 1414 for which the exiting QoS requirements (as indicated by the respective input QoS flows of the second data packets) ought to remain unchanged. TMD logic 1410 may classify the data packets 1409 into first and second data packets 1412 and 1414.

In order to make its determination, TMD logic 1410 may additionally base its decisions on congestion level indication 1411 regarding a congestion level within the network, which may be provided to it by way of AIFC 1407 or otherwise. TMD logic 1410 may use the congestion level indication 1411 to compare it to a trigger criterion for congestion before deciding whether or not and to what extent to change the QoS requirements associated with input QoS flow 2.

TMD logic 1410, similar to TMD logic 1310, may classify the data packets 1409 into first and second data packets 1412 and 1414 based on trigger criteria (e.g., provided by way of instructions 1403 and/or by way of TMD logic 1410 itself)), such as, for example, a type or additional feature of AR/VR data packet, that is, based on a distinction between data packets that correspond to a same application. In the example of FIG. 14, instructions 1403 instructs the QoS microservice associated with an AR/VR application to install and or activate a QoS microservice on data packets associated with an AR/VR application, which, in the shown scenario, are from UE2 in input QoS flow 2. Thus, the TMD logic 1410 may classify UE2's AR/VR data packet as the first data packet for which the existing QoS requirements are to be changed, and may classify the streaming data packet as the second data packet for which the existing QoS requirements (high priority) may remain unchanged changed.

In addition, any of the trigger criteria examples mentioned above may further be superimposed by the TMD logic 1410 in determining how to classify the data packets to be analyzed.

An output of the TMD logic 1410 may be output QoS flow 2, including the SDF2 with the video streaming data packets corresponding to UE2 (but not the SDF3 with the AR/VR data packets corresponding to UE2) and intermediate QoS flow 2 corresponding to first data packets 1412.

First data packets 1412 of intermediate QoS flow 2 are then routed by UPF 1202 a QoS mapping logic 1416 similar to QoS mapping logic 1316 of FIG. 13 that may, according to an embodiment, correspond to a third functionality of the same one or more microservices associated with TMD logic 1410. QoS mapping logic 1416 is to change the existing QoS requirement(s) associated with the first data packets as dictated by the particular QoS microservice being implemented. QoS mapping logic 1416, similar to TMD logic 1410, may be triggered to execute a QoS microservice based on additional trigger criteria, similar to those provided by way of example above.

As shown in FIG. 14, the QoS mapping logic 1416, which may, according to an embodiment, be AI-based, may map the first data packets (AR/VR) to a higher QoS requirement (e.g., higher priority) than that indicated by their existing QoS requirement, while keeping the priority of the second data packets the same. In this manner, whereas SDF Classifier logic 1406 may have mapped the incoming SDFs 1402 into input QoS flows 1 and 2 based on the SDF template stored at the UPF for assigning SDFs to QoS requirements, execution of a QoS microservice according to an embodiment may result in output QoS flows from the UPF that are different from input QoS flows dictated by the SDF template. In the shown embodiment of FIG. 14, whereas the input QoS flows (expected by classification using the SMF SDF template) would have resulted in input QoS flows 1 and 2, the output QoS flows from UPF 1202 correspond to output QoS flows 1, 2 and 3. For example, output QoS flow 1 would include SDFs not subjected to TMD logic 1410 (i.e., in this example, web application SDF1 of UE1) and would thus correspond to input QoS flow 1, output QoS flow 2 may include only SDF2 for UE2 (thus SDFs different from those in input QoS flow 2 because it would have less SDFs), and output QoS flow 3 may include SDF3 from input QoS flow 2. Output QoS flows of the embodiment of FIG. 14 would then be routed for packet transmission through an output of the UPF 1202 in a usual manner, as would be recognized by one skilled in the art.

In FIG. 14, a metering/policing engine may collect QoS mapping metrics from the TMD logic, including, for example, correlations between SDF applications, packet types, congestion criteria, and output QoS flows, and relay that information to the AIFC logic 1407 as part of an optimization process.

Figure 15:
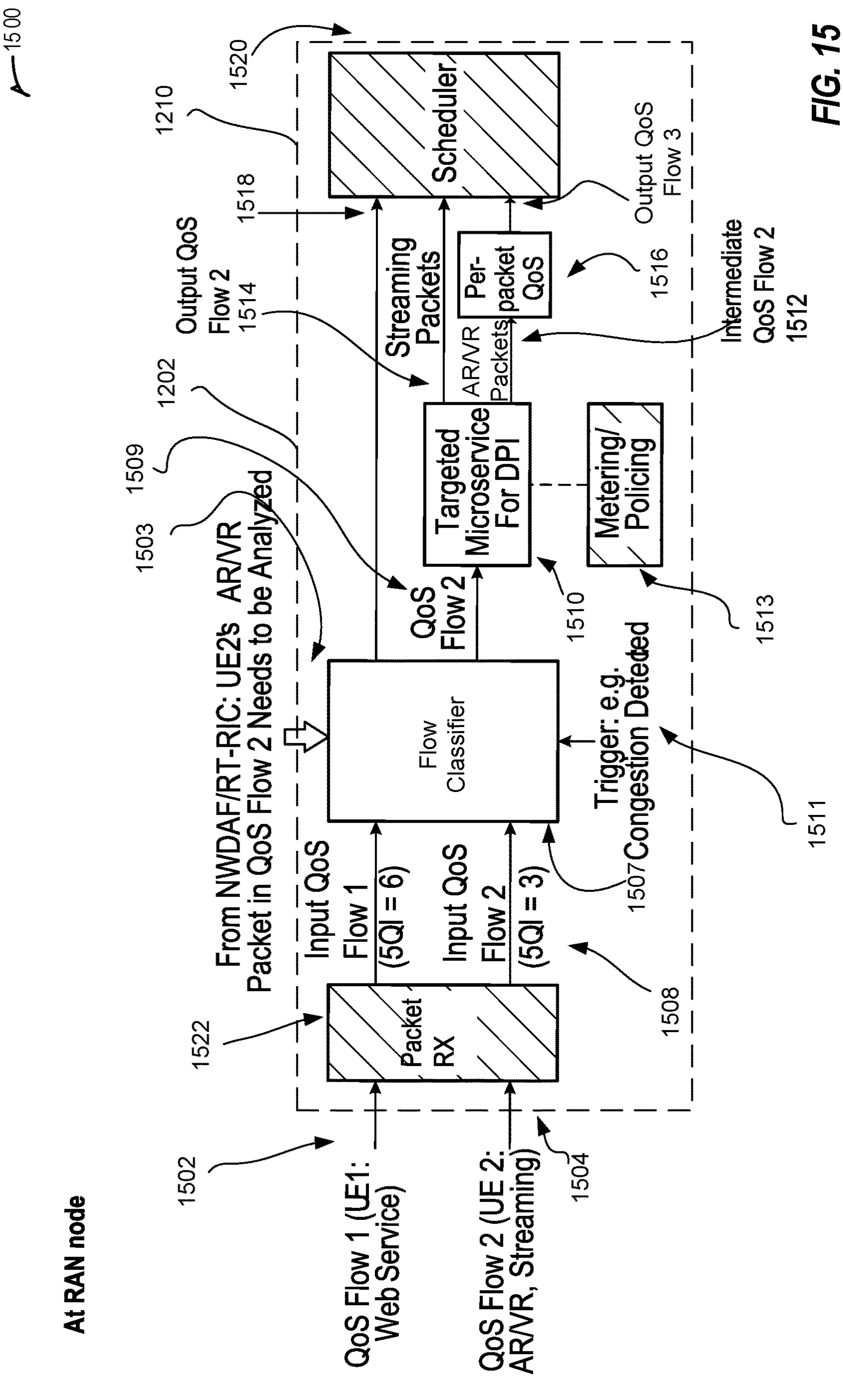
FIG. 15 illustrates a flow to implement a QoS microservice at a RAN node according to a first embodiment.

FIG. 15 shows one example usage of QoS microservice in a gNB to differentiate SDFs within QoS flows and provide differential QoS flows for two different SDFs to a same UE2, namely, AR/VR SDFs and streaming SDFs. In FIG. 15, for UE 2, two different SDFs are mapped to the same QoS flow (QoS flow 2). Generally, the AR/VR packets and streaming packets in 5G receive the same QoS treatment according to the SDF template, because they are mapped to the same QoS flow. In FIG. 15, according to an embodiment, when congestion happens on the air interface, instead of degrading both the AR/VR and the streaming services, the gNB, using a QoS microservice, is to keep the QoS of AR/VR the same while degrading only the streaming service.

The gNB 1210, similar to RAN node 1210 of FIG. 12, shall trigger the installation and/or activation of QoS microservices for AR/VR services at the AIFC logic 1507 and at the TMD logic 1510. In the embodiment of FIG. 15, firstly the AIFC 1507 is to classify the received packets belongs to which QoS flows and then only the packets of QoS flow 2 are input to a targeted microservice for further Packet Inspection and traffic shaping/filtering. The AR/VR packets are filtered, marked with a higher priority and input to scheduler.

FIG. 15 depicts a flow 1500 to be implemented at a RAN node 1210, corresponding for example to RAN node 1210 of FIG. 12 described above.

In flow 1500, SDFs 1502 are received at the RAN node 1210, for example for transmission to or from different UEs UE1 and UE2. The output 1518 of the RAN node 1210 may be to a UPF or to the UEs depending on the direction of transmission.

Individual ones of the SDFs 1502 of FIG. 15 may correspond to separate applications, and have already been classified into QoS flows 1 and 2 by a prior SDF classifier logic based on an SDF template as explained above in the context of FIGS. 13 and 14. QoS flows 1 and 2 thus correspond to QoS classification of SDFs according to the state of the art, and include 5QI information on a per flow basis. They include, for example, SDF1 with associated with a web application to UE1, SDF2 associated with a video streaming application and also SDF 3 associated with an AR/VR application (meaning that multiple different data packets exist in SDF2) to UE2. These SDFs 1502 are provided to an input 1504 of RAN node 1210 at a receive (RX) chain 1522, and routed at the RAN node to an AIFC logic 1507.

In the embodiment of FIG. 15, an AI based Flow Classifier (AIFC) logic 1507 controls a routing of input QoS flows to TMD 1510. TMD 1510 may be similar to TMD 1310 of FIG. 13. AIFC logic may correspond to a first functionality of one or more QoS microservices, each of the QoS microservices corresponding to an application to be executed. AIFC logic 1507 may determine whether or not to route the input QoS flows for deep packet analysis by a TMD logic of a QoS microservice, as will be explained in further detail below.

AIFC logic 1507 may provide an AI-based inference service, such as by an AI based neural network. AIFC logic 1507 may receive instructions 1503 from with respect to which if any input QoS flows to direct for deep packet analysis by the TMD logic 1510 of a QoS microservice deployed at the RAN node 1210. Instructions 1503 may for example be from any physical or virtual component within the 5G network. For example, instructions 1503 may be from a Network Data Analytics Function (NWDAF) or from a Real Time RAN Intelligent Controller (RT-RIC). Based on instructions 1503 and input QoS flows it receives, the AI based engine within AIFC logic 1507 may be used to infer best ways in which to reshape QoS traffic. Instructions 1503 may direct the AIFC logic 1507 with respect to which QoS microservice is needed to be installed/activated (i.e., for which service/application), and optionally for which UE.

For example, a NWDAF, defined in 3GPP TS 29.520 incorporates standard interfaces from the service-based architecture to collect data by subscription or request model from other network functions and similar procedures. This is to deliver analytics functions in the network for automation or reporting, solving major custom interface or format challenges. NWDAF may have a distributed architecture providing analytics at the edge in real-time and, a central function for analytics which need central aggregation (e.g., service experience). The NWDAF may thus be deployed within a CN of a 5G network, and may collect data and provides analytics services using a request or subscription model.

For example, a RT-RIC may reside within a telco edge or regional cloud and typically enables network optimization actions. The RT-RIC may reside within a RAN node.

AIFC logic 1507 may, for example, receive instructions 1503 as noted above, along with input QoS flows 1 and 2 from the Rx chain 1522. In the shown example, the instructions 1503 includes a direction to install or activate a QoS microservice corresponding to AR/VR applications. The AIFC logic 1505 may direct input QoS flow 2 to the TMD 1510 based on the instructions 1503, while directing input QoS flow 1 to the output 1520 as output QoS flow 1.

TMD logic 1510 may be similar to TMD logic 1310 of FIG. 13. According to the shown embodiment of FIG. 15, TMD logic 1510 correspond to a second functionality of one or more QoS microservices, each of the QoS microservices corresponding to an application to be executed. In the shown example, AIFC 1507 is to direct, based on instructions 1503, SDFs corresponding to AR/VR applications to the TMD logic 1510, meaning that, for an AR/VR application for which SDFs are routed to the RAN node 1210, there would be an associated microservice deployed or to be deployed at the RAN node 1210, subject to possible other trigger criteria.

TMD logic 1510 may perform analysis of data packets within SDFs of one or more of the input QoS flows 1508 based on instructions 1503 provided to the AIFC logic 1507. The data packets 1509 to be analyzed by way of TMD logic 1510 ("data packets to be analyzed") are in fact selected based on instructions 1503, and correspond to data packets associated with applications for which corresponding QoS microservices have been or are to be deployed within RAN node 1210. The TMD logic 1510 is to perform deep packet analysis to determine, among the data packets to be analyzed 1509, first data packets 1512 for which the existing QoS requirements (as indicated by the respective input QoS flows of the first data packets) ought to be changed, and second data packets 1514 for which the exiting QoS requirements (as indicated by the respective input QoS flows of the second data packets) ought to remain unchanged. TMD logic 1510 may classify the data packets 1509 into first and second data packets 1512 and 1514.

In order to make its determination, TMD logic 1510 may additionally base its decisions on congestion level indication 1511 regarding a congestion level within the network, which may be provided to AIFC 1507 or otherwise. AIFC 1507 may use the congestion level indication 1511 to compare it to a trigger criterion for congestion before deciding whether or not to route a certain QoS flow to the TMD logic 1510.

TMD logic 1510, similar to TMD logic 1310, may classify the data packets 1509 into first and second data packets 1512 and 1514 based on trigger criteria (e.g., provided by way of instructions 1503 and/or by way of TMD logic 1510 itself)), such as, for example, a type or additional feature of AR/VR data packet, that is, based on a distinction between data packets that correspond to a same application. The type may include for example, a use case for the data packets in a same application, such as, for example, whether an AR/VR packet is for an entertainment use case or for a healthcare use case. In the example of FIG. 15, instructions 1503 instructs the QoS microservice associated with an AR/VR application to install and or activate a QoS microservice on data packets associated with an AR/VR application, which, in the shown scenario, are from UE2 in input QoS flow 2. Thus, the TMD logic 1510 may classify UE2's AR/VR data packet as the first data packet for which the existing QoS requirements are to be changed, and may classify the streaming data packet as the second data packet for which the existing QoS requirements (high priority) may remain unchanged changed.

In addition, any of the trigger criteria examples mentioned above may further be superimposed by the TMD logic 1510 in determining how to classify the data packets to be analyzed.

An output of the TMD logic 1510 may be output QoS flow 2, including the SDF2 with the video streaming data packets corresponding to UE2 (but not the SDF3 with the AR/VR data packets corresponding to UE2) corresponding to second data packet 1514, and intermediate QoS flow 2 corresponding to first data packets 1512.

First data packets 1512 of intermediate QoS flow 2 are then routed by RAN node 1210 a QoS mapping logic 1516 similar to QoS mapping logic 1316 of FIG. 13 that may, according to an embodiment, correspond to a third functionality of the same one or more microservices associated with TMD logic 1510. QoS mapping logic 1516 is to change the existing QoS requirement(s) associated with the first data packets as dictated by the particular QoS microservice being implemented. QoS mapping logic 1516, similar to TMD logic 1510, may be triggered to execute a QoS microservice based on additional trigger criteria, similar to those provided by way of example above.

As shown in FIG. 15, the QoS mapping logic 1516, which may, according to an embodiment, be AI-based, may map the first data packets (AR/VR) to a higher QoS requirement (e.g., higher priority) than that indicated by their existing QoS requirement, while keeping the priority of the second data packets the same. In this manner, whereas input QoS flows 1 and 2 based on the SDF template stored at an UPF coupled to the RAN node 1210 for assigning SDFs to QoS requirements, execution of a QoS microservice according to an embodiment may result in output QoS flows from the RAN node 1210 that are different from input QoS flows 1 and 2 dictated by the SDF template. In the shown embodiment of FIG. 15, whereas the input QoS flows (expected by classification using the SMF SDF template) would have resulted in input QoS flows 1 and 2, the output QoS flows from RAN node 1210 correspond to output QoS flows 1, 2 and 3. For example, output QoS flow 1 would include SDFs not subjected to TMD logic 1510 (i.e., in this example, web application SDF1 of UE1) and would thus correspond to input QoS flow 1, output QoS flow 2 may include only SDF2 for UE2 (thus SDFs different from those in input QoS flow 2 because it would have less SDFs), and output QoS flow 3 may include SDF3 from input QoS flow 2. Output QoS flows of the embodiment of FIG. 15 would then be routed to a scheduler of the RAN node 1210 for packet transmission through an output 1520 of the RAN node 1210 in a usual manner, as would be recognized by one skilled in the art.

In FIG. 15, a metering/policing engine 1513 may collect QoS mapping metrics from the TMD logic, including, for example, correlations between SDF applications, packet types, congestion criteria, and output QoS flows, and relay that information to the AIFC logic 1507 as part of an optimization process.

Figure 16:
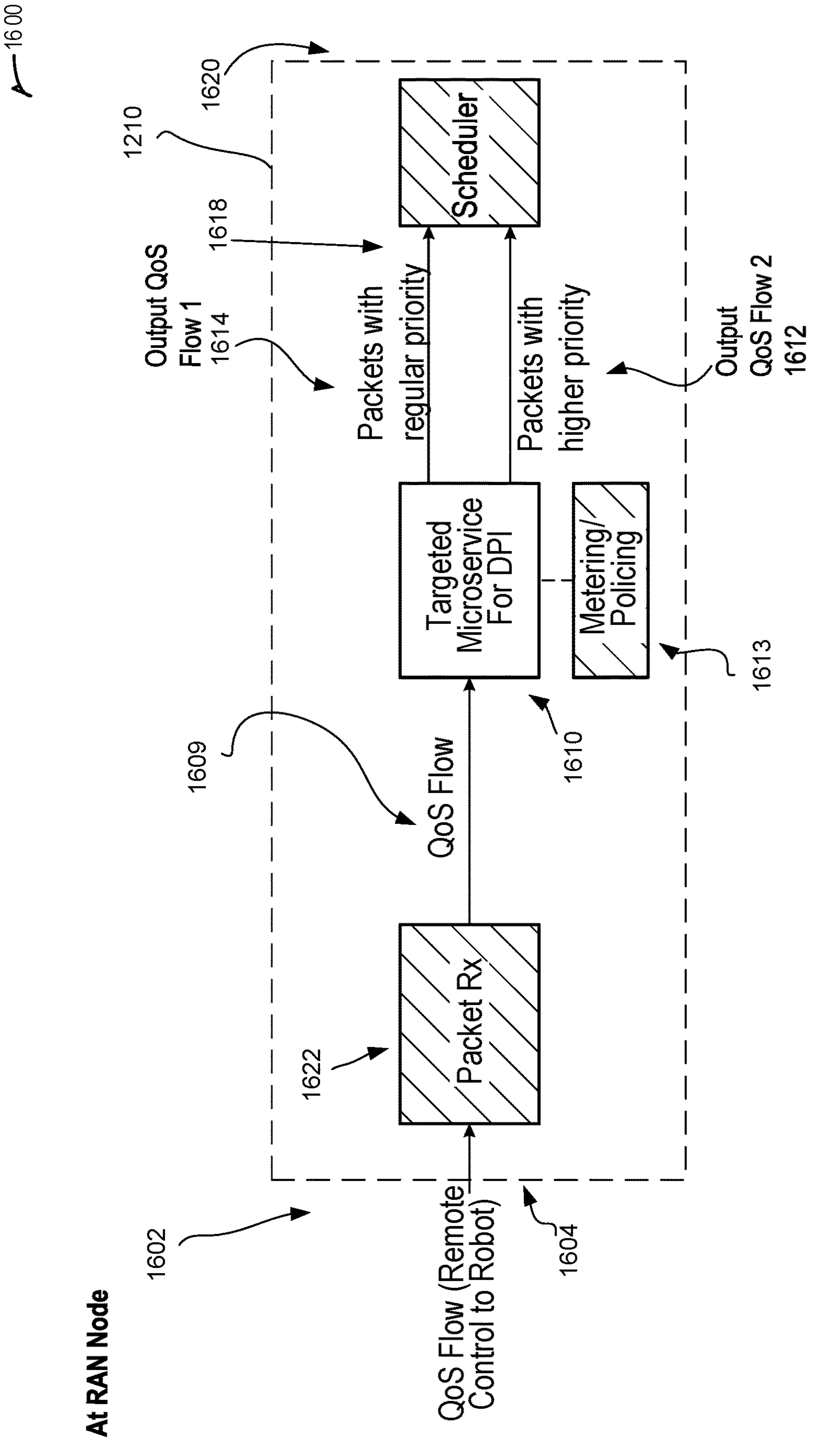
FIG. 16 illustrates a flow to implement a QoS microservice at a RAN node according to a second embodiment.

FIG. 16 provides a flow showing another example usage of a QoS microservice according to an embodiment for providing per-packet QoS, where the use case for the data packets includes industry services, such as controlling a robot in an industrial environment. The robot may include, for example, the remotely controlled robotic arm besides a conveyor belt in a factory tasked to wait for objects to arrive within its reach on the conveyor belt, and then picking up or otherwise manipulating the objects. When an object is approaching the robotic arm, the data packets that are to control the robotic arm movement may be given a higher priority than other data packets by the QoS microservice. QoS information is carried along in each packet in the form of a packet based QoS flow and the targeted microservice may be always active to do the deep packet inspection to filter out the essential packets with higher priority.

FIG. 16 depicts a flow 1600 to be implemented at a RAN node 1210, corresponding for example to RAN node 1210 of FIG. 12 described above.

In flow 1600, SDFs 1602 are received at the RAN node 1210, for example for transmission to a circuitry associated with a robotic arm. SDFs 1602 may include, for example, SDF1 to actuate the robotic arm to pick up an object that is moving near the robotic arm, and SDF2 to cause the circuitry associated with the robotic arm to send metrics regarding operation of the robotic arm to other entities within the 5G network. The output 1618 of the RAN node 1210 may be to a UPF or to the UEs depending on the direction of transmission.

Individual ones of the SDFs 1602 of FIG. 16 may correspond to separate applications, and have already been classified into a single QoS flow 1 by a prior SDF classifier logic based on an SDF template as explained above in the context of FIGS. 13 and 14. QoS flow 1 thus corresponds to QoS classification of SDFs according to the state of the art, and includes 5QI information for the QoS flow 1. These SDFs 1602 are provided to an input 1604 of RAN node 1210 at a receive (RX) chain 1622, and routed at the RAN node to TDM logic 1607.

TMD logic 1610 may be similar to TMD logic 1310 of FIG. 13. According to the shown embodiment of FIG. 16, TMD logic 1610 correspond to a first functionality of one or more QoS microservices, each of the QoS microservices corresponding to an application to be executed. In the shown example, AIFC 1607 is to direct, based on instructions 1603, SDFs corresponding to AR/VR applications to the TMD logic 1610, meaning that, for an AR/VR application for which SDFs are routed to the RAN node 1210, there would be an associated microservice deployed or to be deployed at the RAN node 1210, subject to possible other trigger criteria.

TMD logic 1610 may perform analysis of data packets 1609 within SDFs of the input QoS flow 1609 to the TMD logic 1610. The data packets 1609 to be analyzed by way of TMD logic 1610 ("data packets to be analyzed") correspond to data packets associated with applications for which corresponding QoS microservices have been or are to be deployed within RAN node 1210. The TMD logic 1610 is to perform deep packet analysis to determine, among the data packets to be analyzed 1609, first data packets 1612 for which the existing QoS requirements (as indicated by the input QoS flow 1) ought to be changed, and second data packets 1614 for which the exiting QoS requirements (as indicated by the input QoS flow 1) ought to remain unchanged. TMD logic 1610 may classify the data packets 1609 into first and second data packets 1612 and 1614.

TMD logic 1610, similar to TMD logic 1310, may classify the data packets 1609 into first and second data packets 1612 and 1614 based on trigger criteria, such as, for example, a type or additional feature of AR/VR data packet, that is, based on a distinction between data packets that correspond to a same application. The type may include for example, a use case for the data packets in a same application, such as, for example, whether a data packet is for a use case involving immediate actuation of the robotic arm to pick up an object upon detection of movement of the object on a conveyor belt near the robotic arm (SDF1), or for a use case involving the provision of metrics regarding operation of the robotic arm from circuitry associated with the robotic arm to other entities within the 5G network (SDF2). In the example of FIG. 16, TMD logic 1610 may classify the SDFs in QoS flow 1 as the first data packet SDF1 for which the existing QoS requirements are to be changed, and may classify the second data packet SDF2 for which the existing QoS requirements are to remain unchanged.

In addition, any of the trigger criteria examples mentioned above may further be superimposed by the TMD logic 1610 in determining how to classify the data packets to be analyzed.

An output of the TMD logic 1610 may be output QoS flow 1 including SDF2 at an unchanged (same as input QoS flow 1), lower priority, and output QoS flow 2 including SDF1 set at a higher priority that input QoS flow 1.

In FIG. 16, a metering/policing engine 1613 may collect QoS mapping metrics from the TMD logic, including, for example, correlations between SDF applications, packet types, congestion criteria, and output QoS flows, and relay that information to the network or to the TMD logic as part of an optimization process.

Figure 17:
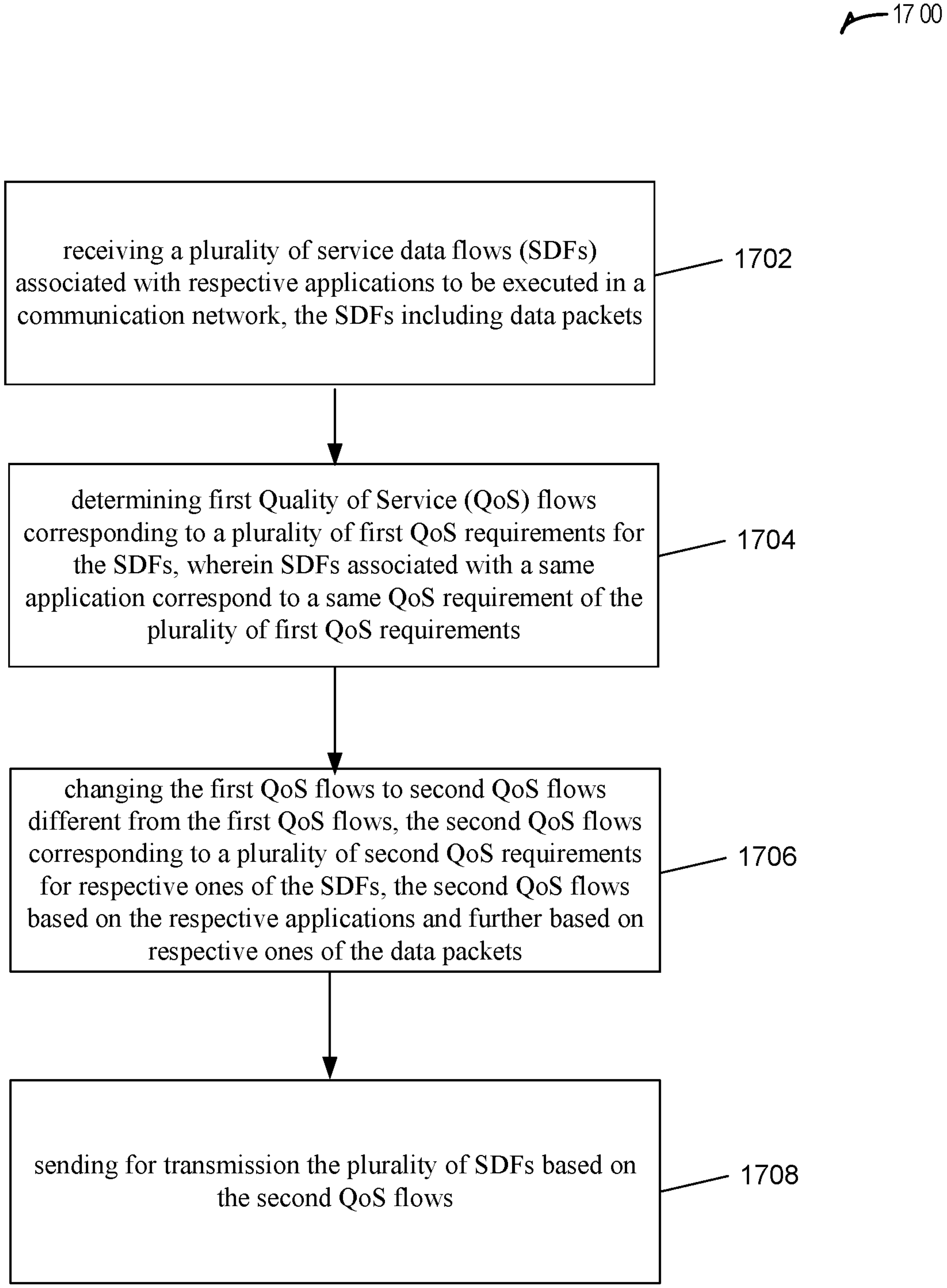
FIG. 17 illustrates a process according to a first embodiment.

FIG. 17 is a process 1700 to be performed at an apparatus of a computing node of a communication network according to some embodiments. Operation 1702 includes receiving a plurality of service data flows (SDFs) associated with respective applications to be executed, the SDFs including data packets; operation 1704 includes determining first Quality of Service (QoS) flows corresponding to a plurality of first QoS requirements for the SDFs, wherein SDFs associated with a same application correspond to a same QoS requirement of the plurality of first QoS requirements; operation 1706 includes changing the first QoS flows to second QoS flows different from the first QoS flows, the second QoS flows corresponding to a plurality of second QoS requirements for respective ones of the SDFs, the second QoS flows based on the respective applications and further based on respective ones of the data packets; and operation 1708 includes sending for transmission the plurality of SDFs based on the second QoS flows.

Advantageously, embodiments do not necessitate changes to be made to either an application or the existing network layer stack as no protocol headers are to be necessarily added/modified/removed. Moreover, since the application is responsible for providing the microservice, embodiments are scalable and customizable, as each application can provide its own microservice and can incorporate changes thereto to keep in sync with changes in the application proper. In addition, embodiments provide a flexible mechanism to deploy/install and uninstall the QoS microservice on any of the intermediate entities of a communication network based on the network's architecture and requirements. Furthermore, advantageously, according to some embodiments, an application can affect the QoS of the packets within its own flows but does not necessarily have to impact the QoS of packets/flows belonging to other applications. The above has the added advantage that relative to other flows, the QoS requirements of the application remain unchanged and thus the application cannot in effect "cheat" and ask for more resources than initially agreed upon based on the QoS agreements with the network.

Example Edge Computing Implementations

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

As referred to below, an "apparatus of" an edge computing node is meant to refer to a "component" of "node," such as of a central node, central server, server, client node, client computing node, client device, client or user, as the component is defined above. A client, client node, or client compute/computing node may refer to an edge computing node that is serving as a client device and, in the examples below, may perform training of a global model using local data, which the client may wish to keep private (e.g., from other nodes). The "apparatus" as referred to herein may refer, for example, to a processor such as processor 852 of edge computing node 850 of FIG. 8, or to the processor 852 of FIG. 8 along with any other components of the edge computing node 850 of FIG. 8, or, for example to circuitry corresponding to a computing node 515 or 523 with virtualized processing capabilities as described in FIG. 5.

EXAMPLES

Example 1 includes an apparatus of a computing node of a communication network, the apparatus including an input, an output, and one or more processing circuitries coupled between the input and the output, the one or more processing circuitries to perform operations including: receiving, at the input, a plurality of service data flows (SDFs) associated with respective applications to be executed, the SDFs including data packets; determining first Quality of Service (QoS) flows corresponding to a plurality of first QoS requirements for the SDFs, wherein SDFs associated with a same application correspond to a same QoS requirement of the plurality of first QoS requirements; redirecting the first QoS flows to second QoS flows different from the first QoS flows, the second QoS flows corresponding to a plurality of second QoS requirements for respective ones of the SDFs, the second QoS flows based on the respective applications and further based on respective ones of the data packets; and sending for transmission from the output the plurality of SDFs based on the second QoS flows.

Example 2 includes the subject matter of Example 1, wherein the second QoS flows are different from the first QoS flows based on at least one of: different QoS requirements as between the second QoS flows and the first QoS flows, or different ones of the SDFs in individual ones of the second QoS flows as compared with SDFs in individual ones of the first QoS flows.

Example 3 includes the subject matter of Example 1, wherein the one or more processors are to receive instructions to install, at the computing node, QoS microservices corresponding to the respective applications, and change the first QoS flows to the second QoS flows after installation of and based on the QoS microservices.

Example 4 includes the subject matter of Example 1, wherein the computing node is a core network (CN), and wherein determining the first QoS flows includes classifying the SDFs into corresponding ones of the plurality of first QoS requirements by identifying the respective applications from the SDFs, and by mapping the respective applications to corresponding ones of the plurality of first QoS requirements.

Example 5 includes the subject matter of Example 4, wherein the one or more processors are to perform functionalities of a User Plane Function (UPF) of the CN.

Example 6 includes the subject matter of Example 1, wherein the computing node is a radio access network (RAN) node, wherein receiving the SDFs includes receiving the first QoS flows, the first QoS flows including the SDFs, and wherein determining the first QoS flows includes decoding QoS information from the first QoS flows.

Example 7 includes the subject matter of any one of Examples 1-6, wherein changing the first QoS flows to the second QoS flows includes selecting one or more SDFs of the plurality of SDFs for analysis, and analyzing the one or more SDFs to determine first data packets and second data packets therefrom, the first data packets corresponding to second QoS requirements of the plurality of second QoS requirements that are different in value from first QoS requirements of the plurality of first QoS requirements for the first data packets, and the second data packets corresponding to second QoS requirements of the plurality of second QoS requirements are a same in value as first QoS requirements of the plurality of first QoS requirements for the second data packets.

Example 8 includes the subject matter of Example 7, wherein selecting includes selecting the one or more SDFs based on one or more applications associated therewith.

Example 9 includes the subject matter of Example 8, wherein selecting includes using selection instructions that include information on the one or more applications associated with the one or more SDFs to be selected.

Example 10 includes the subject matter of Example 9, wherein the selection instructions further include information on one or more user equipments (UEs) associated with the one or more SDFs to be selected.

Example 11 includes the subject matter of any one of Examples 9-10, wherein the selection instructions are from one of a Network Data Analytics. Function (NWDAF) or from a Real Time RAN Intelligent Controller (RT-RIC).

Example 12 includes the subject matter of any one of Examples 7-11, wherein selecting includes using an artificial-intelligence-based flow classification engine.

Example 13 includes the subject matter of any one of Examples 7-12, wherein the one or more processors are to further change the first QoS requirements of the first data packets into the second QoS requirements of the first data packets.

Example 14 includes the subject matter of any one of Examples 7-12, wherein the one or more SDFs are in a same QoS flow of the first QoS flows.

Example 15 includes the subject matter of any one of Examples 1-14, further including a housing, the one or more processors within the housing.

Example 16 includes the subject matter of Example 15, further including a radio integrated circuit coupled to the one or more processors.

Example 17 includes the subject matter of Example 16, further including a front end module coupled to the radio integrated circuit, and one or more antennas coupled to the front end module.

Example 17.1 includes the subject matter of Example 1, wherein receiving the plurality of SDFs, determining the first QoS flows, changing the first QoS flows to second QoS flows, and sending for transmission the plurality of SDFs correspond to a per packet QoS functionality of the apparatus, the method further including enabling or disabling the QoS functionality of the apparatus.

Example 17.2 includes the subject matter of Example 1, wherein some the second QoS requirements overlap with some of the first QoS requirements.

Example 17.3 includes the subject matter of Example 1, wherein at least one of at least some of the plurality of first QoS requirements are different from one another; or at least some of the plurality of second QoS requirements are different from one another.

Example 17.4 includes the subject matter of Example 1, wherein redirecting the first QoS flows to second QoS flows includes reassigning at least some of the SDFs from corresponding ones of the plurality of first QoS requirements to corresponding ones of the plurality of second QoS requirements, the corresponding ones of the plurality of second QoS requirements being different from the corresponding ones of the plurality of first QoS requirements.

Example 17.5 includes the subject matter of Example 7, wherein determining the first data packets and second data packets is based on one or more trigger criteria to distinguish between the first data packets and the second data packets, the trigger criteria including at least one of: an identification of network congestion; a predetermined use schedule; or a use case associated with respective ones of the first data packets and the second data packets.

Example 18 includes one or more non-transitory machine readable storage media having instructions stored thereon, the instructions when executed by an apparatus of a computing node of a communication network to cause the apparatus to perform operations including: receiving a plurality of service data flows (SDFs) associated with respective applications to be executed, the SDFs including data packets; determining first Quality of Service (QoS) flows corresponding to a plurality of first QoS requirements for the SDFs, wherein SDFs associated with a same application correspond to a same QoS requirement of the plurality of first QoS requirements; changing the first QoS flows to second QoS flows different from the first QoS flows, the second QoS flows corresponding to a plurality of second QoS requirements for respective ones of the SDFs, the second QoS flows based on the respective applications and further based on respective ones of the data packets; and sending for transmission the plurality of SDFs based on the second QoS flows.

Example 19 includes the subject matter of Example 18, wherein the second QoS flows are different from the first QoS flows based on at least one of: different QoS requirements as between the second QoS flows and the first QoS flows, or different ones of the SDFs in individual ones of the second QoS flows as compared with SDFs in individual ones of the first QoS flows.

Example 20 includes the subject matter of Example 18, the operations further including receiving instructions to install, at the computing node, QoS microservices corresponding to the respective applications, and change the first QoS flows to the second QoS flows after installation of and based on the QoS microservices.

Example 21 includes the subject matter of Example 18, wherein the computing node is a core network (CN), and wherein determining the first QoS flows includes classifying the SDFs into corresponding ones of the plurality of first QoS requirements by identifying the respective applications from the SDFs, and by mapping the respective applications to corresponding ones of the plurality of first QoS requirements.

Example 22 includes the subject matter of Example 21, the operations further including performing functionalities of a User Plane Function (UPF) of the CN.

Example 23 includes the subject matter of Example 18, wherein the computing node is a radio access network (RAN) node, wherein receiving the SDFs includes receiving the first QoS flows, the first QoS flows including the SDFs, and wherein determining the first QoS flows includes decoding QoS information from the first QoS flows.

Example 24 includes the subject matter of any one of Examples 18-23, wherein changing the first QoS flows to the second QoS flows includes selecting one or more SDFs of the plurality of SDFs for analysis, and analyzing the one or more SDFs to determine first data packets and second data packets therefrom, the first data packets corresponding to second QoS requirements of the plurality of second QoS requirements that are different in value from first QoS requirements of the plurality of first QoS requirements for the first data packets, and the second data packets corresponding to second QoS requirements of the plurality of second QoS requirements are a same in value as first QoS requirements of the plurality of first QoS requirements for the second data packets.

Example 25 includes the subject matter of Example 24, wherein selecting includes selecting the one or more SDFs based on one or more applications associated therewith.

Example 26 includes the subject matter of Example 25, wherein selecting includes using selection instructions that include information on the one or more applications associated with the one or more SDFs to be selected.

Example 27 includes the subject matter of Example 26, wherein the selection instructions further include information on one or more user equipments (UEs) associated with the one or more SDFs to be selected.

Example 28 includes the subject matter of any one of Examples 26-27, wherein the selection instructions are from one of a Network Data Analytics. Function (NWDAF) or from a Real Time RAN Intelligent Controller (RT-RIC).

Example 29 includes the subject matter of any one of Examples 24-28, wherein selecting includes using an artificial-intelligence-based flow classification engine.

Example 30 includes the subject matter of any one of Examples 24-29, the operations further including changing the first QoS requirements of the first data packets into the second QoS requirements of the first data packets.

Example 31 includes the subject matter of any one of Examples 24-29, wherein the one or more SDFs are in a same QoS flow of the first QoS flows.

Example 31.1 includes the subject matter of Example 18, wherein receiving the plurality of SDFs, determining the first QoS flows, changing the first QoS flows to second QoS flows, and sending for transmission the plurality of SDFs correspond to a per packet QoS functionality of the apparatus, the method further including enabling or disabling the QoS functionality of the apparatus.

Example 31.2 includes the subject matter of Example 18, wherein some the second QoS requirements overlap with some of the first QoS requirements.

Example 31.3 includes the subject matter of Example 18, wherein at least one of at least some of the plurality of first QoS requirements are different from one another; or at least some of the plurality of second QoS requirements are different from one another.

Example 31.4 includes the subject matter of Example 18, wherein redirecting the first QoS flows to second QoS flows includes reassigning at least some of the SDFs from corresponding ones of the plurality of first QoS requirements to corresponding ones of the plurality of second QoS requirements, the corresponding ones of the plurality of second QoS requirements being different from the corresponding ones of the plurality of first QoS requirements.

Example 31.5 includes the subject matter of Example 24, wherein determining the first data packets and second data packets is based on one or more trigger criteria to distinguish between the first data packets and the second data packets, the trigger criteria including at least one of: an identification of network congestion; a predetermined use schedule; or a use case associated with respective ones of the first data packets and the second data packets.

Example 32 includes a method to be performed at an apparatus of a computing node of a communication network, the method including: receiving a plurality of service data flows (SDFs) associated with respective applications to be executed, the SDFs including data packets; determining first Quality of Service (QoS) flows corresponding to a plurality of first QoS requirements for the SDFs, wherein SDFs associated with a same application correspond to a same QoS requirement of the plurality of first QoS requirements; changing the first QoS flows to second QoS flows different from the first QoS flows, the second QoS flows corresponding to a plurality of second QoS requirements for respective ones of the SDFs, the second QoS flows based on the respective applications and further based on respective ones of the data packets; and sending for transmission the plurality of SDFs based on the second QoS flows.

Example 33 includes the subject matter of Example 32, wherein the second QoS flows are different from the first QoS flows based on at least one of: different QoS requirements as between the second QoS flows and the first QoS flows, or different ones of the SDFs in individual ones of the second QoS flows as compared with SDFs in individual ones of the first QoS flows.

Example 34 includes the subject matter of Example 32, the method further including receiving instructions to install, at the computing node, QoS microservices corresponding to the respective applications, and change the first QoS flows to the second QoS flows after installation of and based on the QoS microservices.

Example 35 includes the subject matter of Example 32, wherein the computing node is a core network (CN), and wherein determining the first QoS flows includes classifying the SDFs into corresponding ones of the plurality of first QoS requirements by identifying the respective applications from the SDFs, and by mapping the respective applications to corresponding ones of the plurality of first QoS requirements.

Example 36 includes the subject matter of Example 35, the method further including performing functionalities of a User Plane Function (UPF) of the CN.

Example 37 includes the subject matter of Example 32, wherein the computing node is a radio access network (RAN) node, wherein receiving the SDFs includes receiving the first QoS flows, the first QoS flows including the SDFs, and wherein determining the first QoS flows includes decoding QoS information from the first QoS flows.

Example 38 includes the subject matter of any one of Examples 32-37, wherein changing the first QoS flows to the second QoS flows includes selecting one or more SDFs of the plurality of SDFs for analysis, and analyzing the one or more SDFs to determine first data packets and second data packets therefrom, the first data packets corresponding to second QoS requirements of the plurality of second QoS requirements that are different in value from first QoS requirements of the plurality of first QoS requirements for the first data packets, and the second data packets corresponding to second QoS requirements of the plurality of second QoS requirements are a same in value as first QoS requirements of the plurality of first QoS requirements for the second data packets.

Example 39 includes the subject matter of Example 38, wherein selecting includes selecting the one or more SDFs based on one or more applications associated therewith.

Example 40 includes the subject matter of Example 39, wherein selecting includes using selection instructions that include information on the one or more applications associated with the one or more SDFs to be selected.

Example 41 includes the subject matter of Example 40, wherein the selection instructions further include information on one or more user equipments (UEs) associated with the one or more SDFs to be selected.

Example 42 includes the subject matter of any one of Examples 40-41, wherein the selection instructions are from one of a Network Data Analytics. Function (NWDAF) or from a Real Time RAN Intelligent Controller (RT-RIC).

Example 43 includes the subject matter of any one of Examples 38-42, wherein selecting includes using an artificial-intelligence-based flow classification engine.

Example 44 includes the subject matter of any one of Examples 38-43, the method further including changing the first QoS requirements of the first data packets into the second QoS requirements of the first data packets.

Example 45 includes the subject matter of any one of Examples 38-43, wherein the one or more SDFs are in a same QoS flow of the first QoS flows.

Example 45.1 includes the subject matter of Example 32, wherein receiving the plurality of SDFs, determining the first QoS flows, changing the first QoS flows to second QoS flows, and sending for transmission the plurality of SDFs correspond to a per packet QoS functionality of the apparatus, the method further including enabling or disabling the QoS functionality of the apparatus.

Example 45.2 includes the subject matter of Example 32, wherein some the second QoS requirements overlap with some of the first QoS requirements.

Example 45.3 includes the subject matter of Example 32, wherein at least one of at least some of the plurality of first QoS requirements are different from one another; or at least some of the plurality of second QoS requirements are different from one another.

Example 45.4 includes the subject matter of Example 32, wherein redirecting the first QoS flows to second QoS flows includes reassigning at least some of the SDFs from corresponding ones of the plurality of first QoS requirements to corresponding ones of the plurality of second QoS requirements, the corresponding ones of the plurality of second QoS requirements being different from the corresponding ones of the plurality of first QoS requirements.

Example 45.5 includes the subject matter of Example 38, wherein determining the first data packets and second data packets is based on one or more trigger criteria to distinguish between the first data packets and the second data packets, the trigger criteria including at least one of: an identification of network congestion; a predetermined use schedule; or a use case associated with respective ones of the first data packets and the second data packets.

Example 46 includes a computer program comprising the instructions of any one of Examples 32-45.5.

Example 47 includes an Application Programming Interface defining functions, methods, variables, data structures, and/or protocols for the instructions of any one of Examples 32-45.5.

Example 48 includes an apparatus comprising circuitry loaded with the instructions of any one of Examples 32-45.5.

Example 49 includes an apparatus comprising circuitry operable to run the instructions of any one of Examples 32-45.5.

Example 50 includes an integrated circuit comprising one or more of the processor circuitries of any one of Examples 1-17 and the one or more computer readable storage media of any one of Examples 32-45.5.

Example 51 includes a computing system comprising the one or more computer readable media of any one of Examples 32-45.5 and the one or more processing circuitries of any one of Examples 1-17.

Example 52 includes an apparatus comprising means for executing the method of any one of Examples 32-45.5.

Example 53 includes a signal generated as a result of executing the instructions of any one of Examples 32-45.5.

Example 54 includes a data unit generated as a result of executing the instructions of any one of Examples 32-45.5.

Example 55 includes the subject matter of Example 54, wherein the data unit is a datagram, network packet, data frame, data segment, a Protocol Data Unit (PDU), a Service Data Unit (SDU), a message, or a database object.

Example 56 includes a signal encoded with the data unit of any one of Examples 54-55.

Example 57 includes an electromagnetic signal carrying the instructions of any one of Examples 32-45.5.

Example 58 includes an apparatus comprising means for performing the method of any one of Examples 32-45.5.

Example 59 includes the subject matter of Example 1, further comprising sending and receiving wireless communications using a transceiver coupled to the one or more processors.

Example 60 includes an apparatus comprising means to perform one or more elements of a method of any one of Examples 32-45.5.

Example 61 includes a machine-readable storage medium including machine-readable instructions which, when executed, implement the method of any one of Examples 32-45.

Example 62 includes a distributed edge computing system comprising: a central server; a plurality of computing nodes communicably coupled to the central server, at least one of the computing nodes including one or more processors and instructions that, when executed by the one or more processors, cause the at least one of the computing nodes to perform operations corresponding the method of any one of Examples 32-45.5.

What is claimed is:

1. An apparatus of a computing node of a communication network, the apparatus including an input, an output, and one or more processing circuitries coupled between the input and the output, the one or more processing circuitries to perform operations including:

receiving, at the input, a plurality of service data flows (SDFs) associated with respective applications to be executed, the SDFs including data packets;

determining first Quality of Service (QoS) flows corresponding to a plurality of first QoS requirements for the SDFs, wherein SDFs associated with a same application correspond to a same QoS requirement of the plurality of first QoS requirements;

changing the first QoS flows to second QoS flows different from the first QoS flows, the second QoS flows corresponding to a plurality of second QoS requirements for respective ones of the SDFs, the second QoS flows based on the respective applications and further based on respective ones of the data packets; and sending for transmission from the output the plurality of SDFs based on the second QoS flows.

2. The apparatus of claim 1, wherein the second QoS flows are different from the first QoS flows based on at least one of: different QoS requirements as between the second QoS flows and the first QoS flows, or different ones of the SDFs in individual ones of the second QoS flows as compared with SDFs in individual ones of the first QoS flows.

3. The apparatus of claim 1, wherein the one or more processing circuitries are to receive instructions to install, at the computing node, QoS microservices corresponding to the respective applications, and change the first QoS flows to the second QoS flows after installation of and based on the QoS microservices.

4. The apparatus of claim 1, wherein the computing node is a core network (CN), and wherein determining the first QoS flows includes classifying the SDFs into corresponding ones of the plurality of first QoS requirements by identifying the respective applications from the SDFs, and by mapping the respective applications to corresponding ones of the plurality of first QoS requirements.

5. The apparatus of claim 4, wherein the one or more processing circuitries are to perform functionalities of a User Plane Function (UPF) of the CN.

6. The apparatus of claim 1, wherein the computing node is a radio access network (RAN) node, wherein receiving the SDFs includes receiving the first QoS flows, the first QoS flows including the SDFs, and wherein determining the first QoS flows includes decoding QoS information from the first QoS flows.

7. The apparatus of claim 1, wherein changing the first QoS flows to the second QoS flows includes selecting one or more SDFs of the plurality of SDFs for analysis, and analyzing the one or more SDFs to determine first data packets and second data packets therefrom, the first data packets corresponding to second QoS requirements of the plurality of second QoS requirements that are different in value from first QoS requirements of the plurality of first QoS requirements for the first data packets, and the second data packets corresponding to second QoS requirements of the plurality of second QoS requirements are a same in value as first QoS requirements of the plurality of first QoS requirements for the second data packets.

8. The apparatus of claim 7, wherein selecting includes selecting the one or more SDFs based on one or more applications associated therewith.

9. The apparatus of claim 8, wherein selecting includes using selection instructions that include information on the one or more applications associated with the one or more SDFs to be selected.

10. The apparatus of claim 9, wherein the selection instructions further include information on one or more user equipments (UEs) associated with the one or more SDFs to be selected.

11. The apparatus of claim 9, wherein the selection instructions are from one of a Network Data Analytics Function (NWDAF) or from a Real Time RAN Intelligent Controller (RT-RIC).

12. The apparatus of claim 7, wherein the one or more processing circuitries are to further change the first QoS requirements of the first data packets into the second QoS requirements of the first data packets.

13. The apparatus of claim 7, wherein the one or more SDFs are in a same QoS flow of the first QoS flows.

14. The apparatus of claim 1, further including a radio integrated circuit coupled to the one or more processing circuitries, a front end module coupled to the radio integrated circuit, and one or more antennas coupled to the front end module.

15. One or more non-transitory machine readable storage media having instructions stored thereon, the instructions when executed by an apparatus of a computing node of a communication network to cause the apparatus to perform operations including:

receiving a plurality of service data flows (SDFs) associated with respective applications to be executed, the SDFs including data packets;

determining first Quality of Service (QoS) flows corresponding to a plurality of first QoS requirements for the SDFs, wherein SDFs associated with a same application correspond to a same QoS requirement of the plurality of first QoS requirements;

changing the first QoS flows to second QoS flows different from the first QoS flows, the second QoS flows corresponding to a plurality of second QoS requirements for respective ones of the SDFs, the second QoS flows based on the respective applications and further based on respective ones of the data packets; and sending for transmission the plurality of SDFs based on the second QoS flows.

16. The storage media of claim 15, wherein the second QoS flows are different from the first QoS flows based on at least one of: different QoS requirements as between the second QoS flows and the first QoS flows, or different ones of the SDFs in individual ones of the second QoS flows as compared with SDFs in individual ones of the first QoS flows.

17. The storage media of claim 15, the operations further including receiving instructions to install, at the computing node, QoS microservices corresponding to the respective applications, and change the first QoS flows to the second QoS flows after installation of and based on the QoS microservices.

18. The storage media of claim 15, wherein the computing node is a core network (CN), and wherein determining the first QoS flows includes classifying the SDFs into corresponding ones of the plurality of first QoS requirements by identifying the respective applications from the SDFs, and by mapping the respective applications to corresponding ones of the plurality of first QoS requirements.

19. The storage media of claim 18, the operations further including performing functionalities of a User Plane Function (UPF) of the CN.

20. A method to be performed at an apparatus of a computing node of a communication network, the method including:

receiving a plurality of service data flows (SDFs) associated with respective applications to be executed, the SDFs including data packets;

determining first Quality of Service (QoS) flows corresponding to a plurality of first QoS requirements for the SDFs, wherein SDFs associated with a same application correspond to a same QoS requirement of the plurality of first QoS requirements;

changing the first QoS flows to second QoS flows different from the first QoS flows, the second QoS flows corresponding to a plurality of second QoS requirements for respective ones of the SDFs, the second QoS flows based on the respective applications and further based on respective ones of the data packets; and sending for transmission the plurality of SDFs based on the second QoS flows.

21. The method of claim 20, wherein the computing node is a radio access network (RAN) node, wherein receiving the SDFs includes receiving the first QoS flows, the first QoS flows including the SDFs, and wherein determining the first QoS flows includes decoding QoS information from the first QoS flows.

22. The method of claim 20, wherein changing the first QoS flows to the second QoS flows includes selecting one or more SDFs of the plurality of SDFs for analysis, and analyzing the one or more SDFs to determine first data packets and second data packets therefrom, the first data packets corresponding to second QoS requirements of the plurality of second QoS requirements that are different in value from first QoS requirements of the plurality of first QoS requirements for the first data packets, and the second data packets corresponding to second QoS requirements of the plurality of second QoS requirements are a same in value as first QoS requirements of the plurality of first QoS requirements for the second data packets.

23. The method of claim 22, wherein selecting includes selecting the one or more SDFs based on one or more applications associated therewith.

24. The method of claim 23, wherein selecting includes using selection instructions that include information on the one or more applications associated with the one or more SDFs to be selected.

25. The method of claim 24, wherein the selection instructions further include information on one or more user equipments (UEs) associated with the one or more SDFs to be selected.

* * * * *